US012649232B2

(12) United States Patent
Liu et al.

(10) Patent No.: US 12,649,232 B2
(45) Date of Patent: Jun. 9, 2026

(54) SPEED DETERMINATION IN ROBOTICS SYSTEMS AND APPLICATIONS

(71) Applicant: NVIDIA CORPORATION, Santa Clara, CA (US)

(72) Inventors: Wei Liu, Santa Clara, CA (US); Pulkit Goyal, San Jose, CA (US); Lionel Federico Gulich, Zurich (CH); Billy Omondi Okal, Santa Clara, CA (US); Soha Pouya, Los Altos, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 18/597,688

(22) Filed: Mar. 6, 2024

(65) Prior Publication Data

US 2025/0282051 A1 Sep. 11, 2025

(51) Int. Cl.
B25J 9/16 (2006.01)
B25J 13/08 (2006.01)

(52) U.S. Cl.
CPC ........... B25J 9/1651 (2013.01); B25J 9/1666 (2013.01); B25J 13/089 (2013.01)

(58) Field of Classification Search
CPC ...... B65J 9/1651; B65J 9/1666; B65J 13/089; B60W 30/095; B60W 30/0956; B60W 30/08
USPC ............................ 700/245, 253, 255; 701/26
See application file for complete search history.

(56) References Cited

U.S. PATENT DOCUMENTS

| | | | |
|---|---|---|---|
| 9,623,905 B2 * | 4/2017 | Shashua | G01S 5/16 |
| 9,910,442 B2 * | 3/2018 | Kamata | G05D 1/0274 |
| 11,274,929 B1 * | 3/2022 | Afrouzi | G06T 7/30 |
| 11,618,439 B2 * | 4/2023 | Magzimof | B60W 30/146 |
| | | | 701/2 |
| 2012/0179322 A1 | 7/2012 | Hennessy et al. | |
| 2017/0165835 A1 | 6/2017 | Agarwal et al. | |
| 2018/0024567 A1 * | 1/2018 | Ferguson | G06V 20/56 |
| | | | 701/23 |
| 2020/0026301 A1 * | 1/2020 | Taylor | G05D 1/0214 |
| 2020/0191591 A1 * | 6/2020 | Zhang | G06V 20/582 |

(Continued)

FOREIGN PATENT DOCUMENTS

GB 2605858 A * 10/2022 ......... G01C 21/3407

OTHER PUBLICATIONS

Final Office Action received for U.S. Appl. No. 18/597,682 dated Dec. 16, 2025, 17 pages.

(Continued)

*Primary Examiner* — Khoi H Tran
(74) *Attorney, Agent, or Firm* — Squire Patton Boggs LLP; Sarah Mirza

(57) ABSTRACT

In various examples, a technique for generating speed change decisions for a mobile robot includes identifying, using one or more maps of a physical environment, one or more obstacles associated with one or more portions of a path of the mobile robot in the physical environment. The technique also includes generating, based at least on the one or more obstacles, one or more speed constraints, each speed constraint specifying a speed limit for a respective portion of the path. The technique further includes generating one or more speed change decisions specifying actions to be performed by the mobile robot to cause a speed profile of the mobile robot to satisfy the one or more speed constraints.

19 Claims, 15 Drawing Sheets

(56) References Cited

U.S. PATENT DOCUMENTS

| | | | |
|---|---|---|---|
| 2020/0372012 A1* | 11/2020 | Averbuch | G06F 16/2379 |
| 2021/0080967 A1* | 3/2021 | Pettinger | G05D 1/0221 |
| 2021/0191407 A1 | 6/2021 | Benisch et al. | |
| 2021/0291363 A1* | 9/2021 | Sarkar | G05D 1/0246 |
| 2021/0295067 A1* | 9/2021 | Jiao | G08G 1/096775 |
| 2022/0026920 A1* | 1/2022 | Ebrahimi Afrouzi | G06N 7/01 |
| 2023/0140569 A1* | 5/2023 | Foster | B60W 30/146 |
| | | | 701/400 |
| 2023/0159056 A1 | 5/2023 | Cheng et al. | |
| 2023/0367324 A1* | 11/2023 | Ebrahimi Afrouzi | |
| | | | A47L 9/2826 |
| 2024/0168480 A1 | 5/2024 | Varadarajan et al. | |
| 2024/0272643 A1 | 8/2024 | Sun et al. | |
| 2024/0308526 A1* | 9/2024 | Alleva | G01C 21/3822 |
| 2024/0310846 A1 | 9/2024 | Jeon et al. | |
| 2024/0310851 A1* | 9/2024 | Ebrahimi Afrouzi | G01S 17/87 |
| 2024/0319735 A1 | 9/2024 | Sadhu et al. | |
| 2024/0324838 A1* | 10/2024 | Ebrahimi Afrouzi | |
| | | | G05D 1/2446 |
| 2024/0328822 A1* | 10/2024 | Fu | G01C 21/3889 |
| 2025/0163681 A1* | 5/2025 | Gajic | E02F 9/205 |

OTHER PUBLICATIONS

Non-Final Office Action received for U.S. Appl. No. 18/597,682 dated Apr. 15, 2026, 18 pages.

* cited by examiner

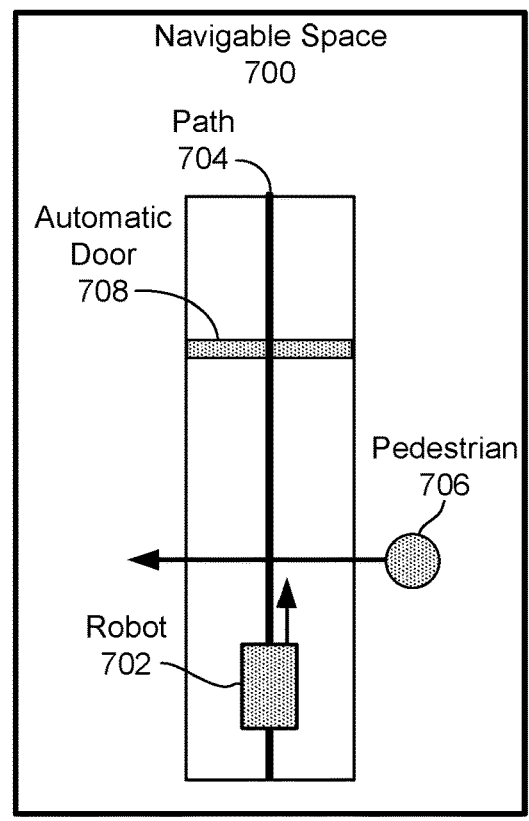
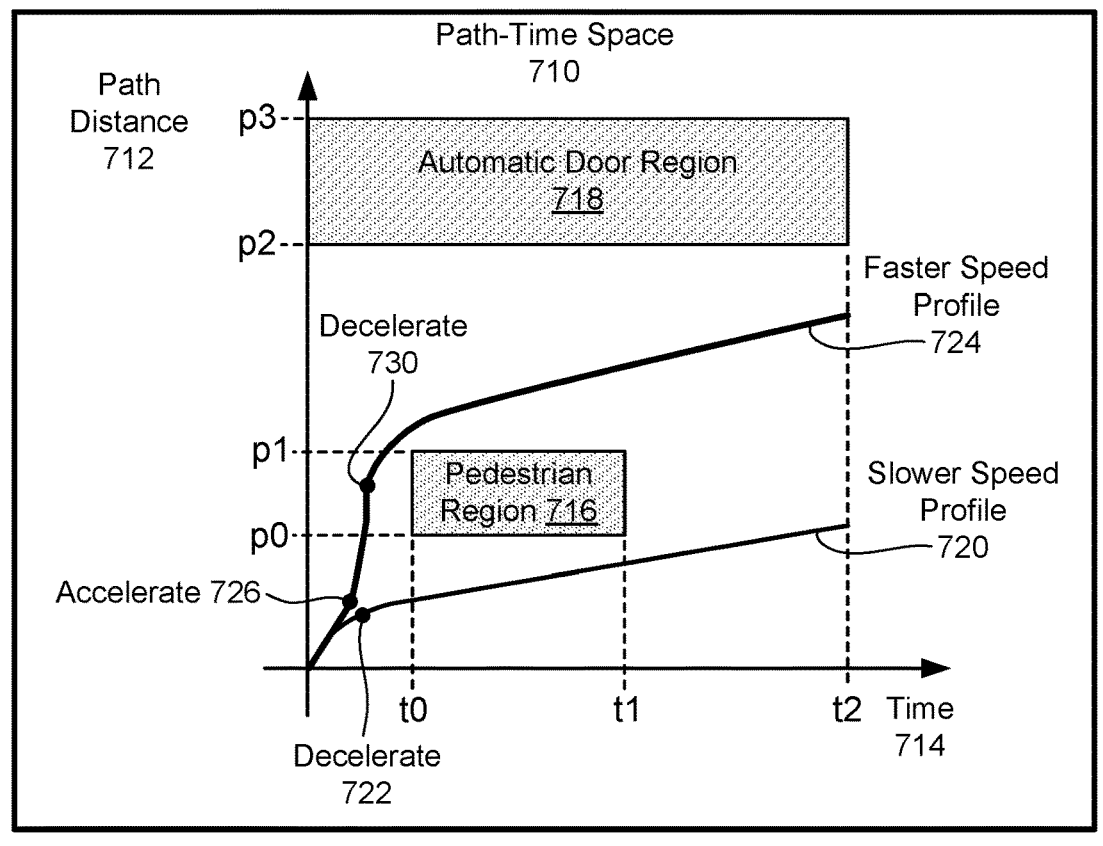
FIGURE 7

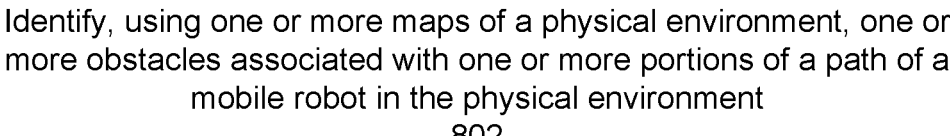

800

Identify, using one or more maps of a physical environment, one or more obstacles associated with one or more portions of a path of a mobile robot in the physical environment
802

Generate, based at least on the one or more obstacles, one or more speed constraints, each speed constraint specifying a speed limit for a respective portion of the path
804

Generate one or more speed change decisions specifying actions to be performed by the mobile robot to cause a speed profile of the mobile robot to satisfy the one or more speed constraints
806

Convert the speed change decisions to one or more speed directives specifying speed limits for the mobile robot in specified distance ranges during specified time ranges
808

Cause the mobile robot to navigate in accordance with the speed change directives
810

SERVER(S) 9178

CPU 9180(B)

PCIE SWITCH 9182(D)

PCIE SWITCH 9182(C)

GPU 9184(F)

GPU 9184(H)

GPU 9184(E)

GPU 9184(G)

9186

CPU 9180(A)

PCIE SWITCH 9182(B)

PCIE SWITCH 9182(A)

GPU 9184(B)

GPU 9184(D)

9188

GPU 9184(A)

GPU 9184(C)

9100

9194

9192

NETWORK(S) 9190

1100

APPLICATION LAYER 1140

APPLICATION(S) 1142

SOFTWARE LAYER 1130

SOFTWARE 1132

FRAMEWORK LAYER 1120

JOB SCHEDULER 1133 ← CONFIGURATION MANAGER 1134

DISTRIBUTED FILE SYSTEM 1138

RESOURCE MANAGER 1136

DATA CENTER INFRASTRUCTURE LAYER 1110

RESOURCE ORCHESTRATOR 1112

GROUPED COMPUTING RESOURCES 1114

NODE C.R. 1116(1)    NODE C.R. 1116(2)    • • •    NODE C.R. 1116(N)

SPEED DETERMINATION IN ROBOTICS SYSTEMS AND APPLICATIONS

BACKGROUND

To traverse an environment, many autonomous or semi-autonomous mobile robots or other machine types move through the environment to a given destination according to a route or path determined using a path planner. An efficient route should minimize the time and/or distance of travel to the destination, should safely avoid static and moving obstacles, and should be generated in a short amount of time to avoid delays between receiving mission instructions and executing the mission.

Existing approaches for route or path planning use a route or path planner to find a route or path plan that specifies an efficient route from a starting point to a destination point. The route plan includes a sequence of waypoints, each of which corresponds to a location in the physical environment of a mobile robot. The robot moves to each waypoint in the sequence to reach the destination point. In existing approaches, route plans can cover distances that are relatively short such as 5-10 meters, and longer distances such as 1 kilometer or more. The existing approaches do not scale well to such longer distances, however. For example, in existing approaches, the route planner searches for a route from the start to the destination. For a longer distance between the start and the destination, such as 1 kilometer or more, processing the numerus possible routes can be an intractable searching problem that is impractical to solve in a short amount of time-which may limit these types of approaches for real-time or near real-time deployments.

Further, existing approaches do not account for changes in speed that are made by the robot as it encounters regions of different types that affect the speed at which the robot moves while executing the mission. Further, existing route planning approaches do not take interactions with dynamic obstacles into account when determining route plans. The interactions with dynamic obstacles, such as automatic doors that can open and close, can cause the robot to adjust its speed while executing the mission. Since existing route planning approaches do not take such regions and dynamic obstacle interactions into account, portions of the route that pass through regions of different types and/or regions having dynamic obstacles can take more time to traverse than expected by the route planner. The route planner can incorrectly select route plans having such regions instead of other route plans that would have lower travel time and/or shorter distance when executed by the robot, e.g., if the other route plans have longer travel time or distance in comparison to route plans determined without taking into account speed reductions the robot makes when it encounters regions of different types and/or dynamic obstacles while executing a mission. Still further, in existing approaches, the path planner has limited extensibility and adaptability to changes in the robot system. For example, existing path planners do not readily accommodate different drivetrain configurations or different space representations. Accordingly, existing path planners are difficult to adapt to different kinematics and maneuvering capabilities.

As such, a need exists for more effective techniques for generating route plans for long distances and/or for environments having regions of different types that affect the speed at which a robot moves in autonomous or semi-autonomous systems.

SUMMARY

Embodiments of the present disclosure relate to generating speed change decisions for a mobile robot. The tech-niques described herein include identifying, using one or more maps of a physical environment, one or more obstacles associated with one or more portions of a path of the mobile robot in the physical environment. The techniques also include generating, based at least on the one or more obstacles, one or more speed constraints, each speed constraint specifying a speed limit for a respective portion of the path. The techniques further include generating one or more speed change decisions specifying actions to be performed by the mobile robot to cause a speed profile of the mobile robot to satisfy the one or more speed constraints.

One technical advantage of the disclosed techniques relative to prior approaches is the ability to efficiently navigate large environments because, for example, fine-grain path planning is performed on individual regions on a route plan instead of the substantially larger area between the start and destination locations of the route plan. Further, Frenet coordinate discretization may be used in the regions to improve the efficiency of path searching by focusing the path search on a space near the path. Accordingly, the disclosed techniques are faster and less resource-intensive than prior approaches that use a single path planner to generate the route. Another technical advantage of the disclosed techniques is the ability to dynamically adjust speed using semantic information from map labels and real-time or near real-time perception, such as predicted positions of dynamic obstacles. Adjusting the speed in this way results in smoother robot motion, for example. Accordingly, the disclosed techniques allow the robot to navigate more safely and efficiently through the environment than prior approaches that do not use semantic information to dynamically adjust speed. These technical advantages represent one or more technological improvements over prior approaches.

BRIEF DESCRIPTION OF THE DRAWINGS

The present systems and methods for route or path planning for robotics systems and applications are described in detail below with reference to the attached drawing figures, wherein:

FIG. 7 illustrates a navigable space that includes static and dynamic obstacles, and a path-time space representation of the navigable space, according to various embodiments;

FIG. 8 illustrates a flow diagram of a method for generating speed directives for a path, according to various embodiments;

DETAILED DESCRIPTION

Figure 9A:
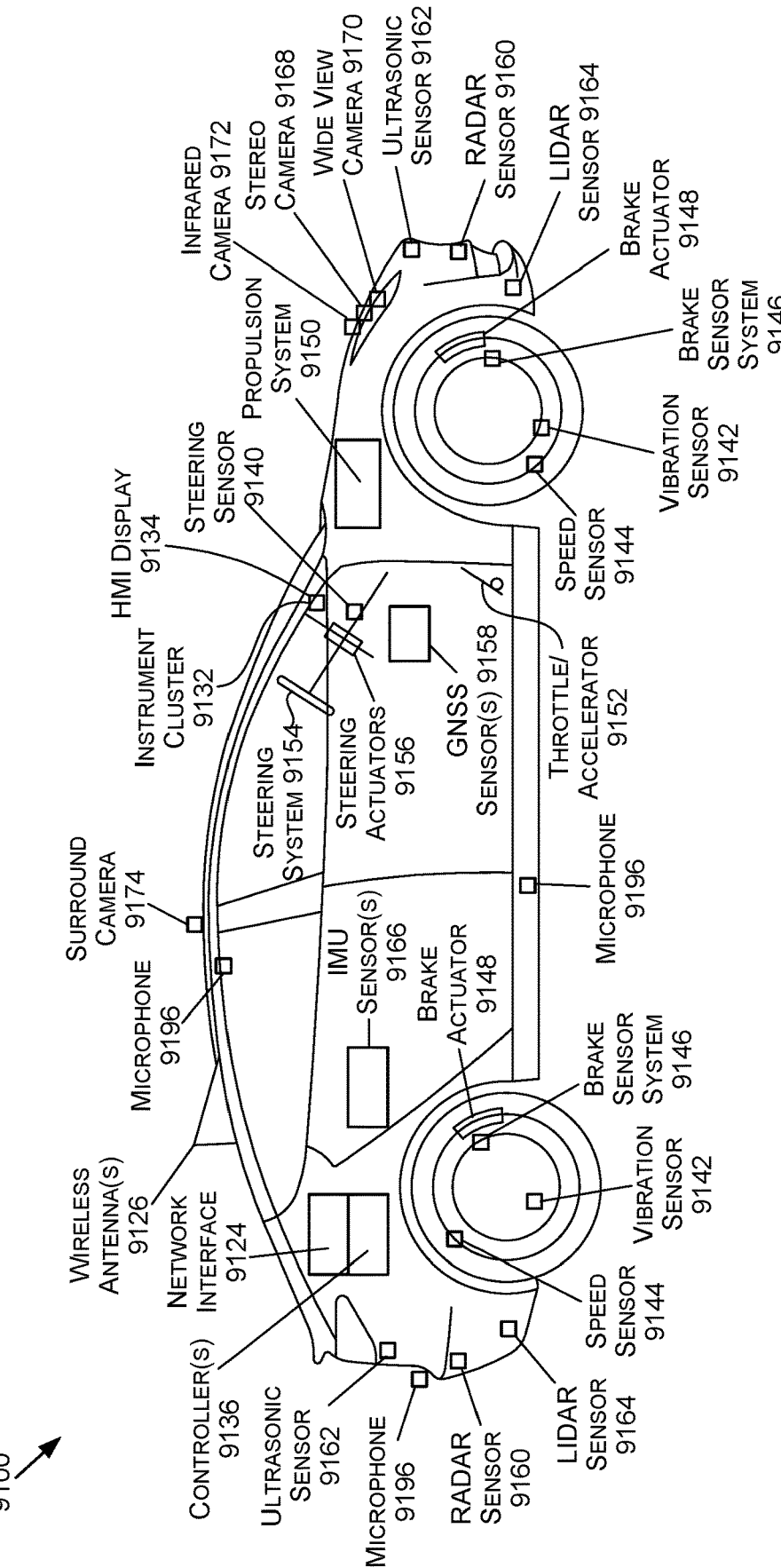
FIG. 9A is an illustration of an example autonomous vehicle, in accordance with some embodiments of the present disclosure.
Figure 9B:
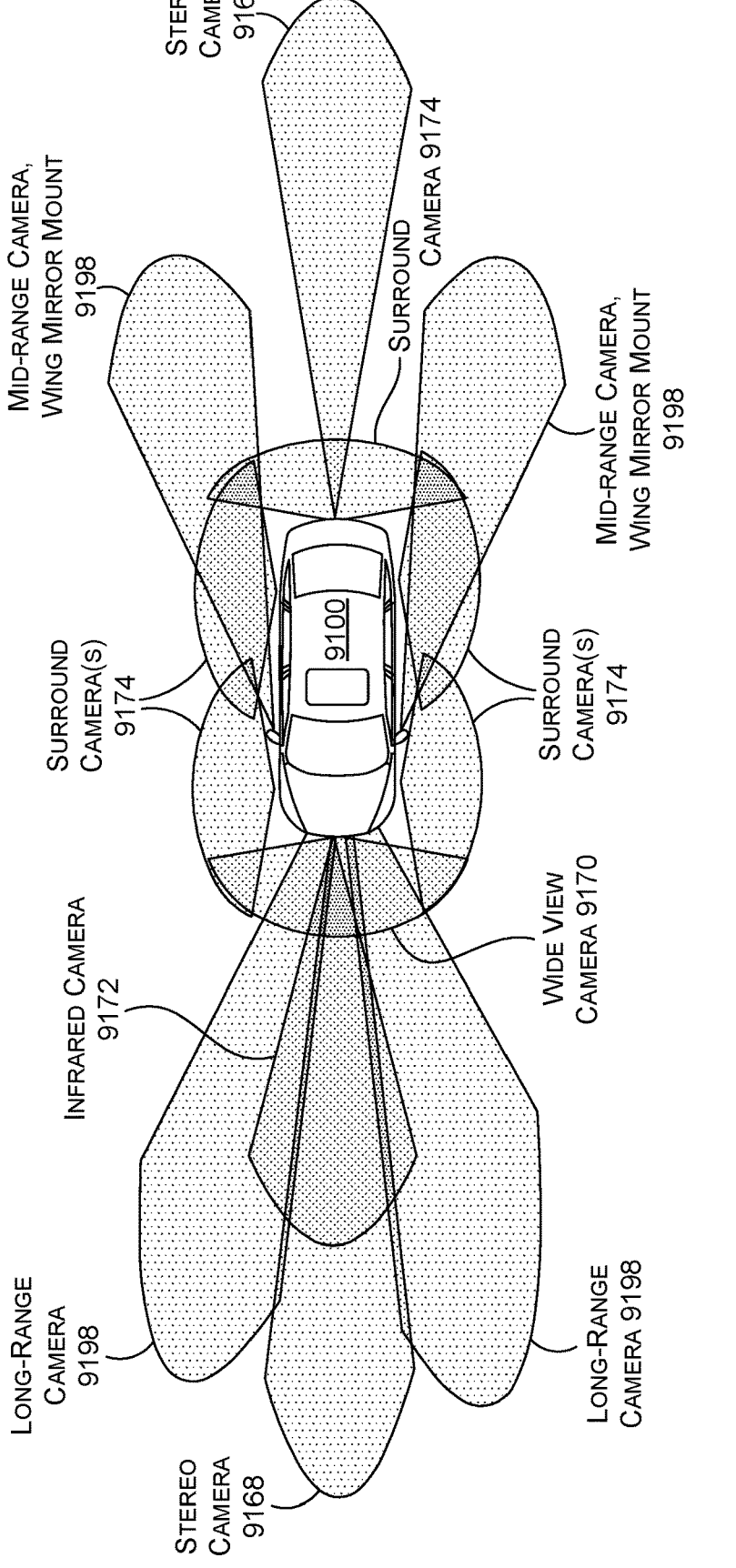
FIG. 9B is an example of camera locations and fields of view for the example autonomous vehicle of FIG. 9A, in accordance with some embodiments of the present disclosure.
Figure 9C:
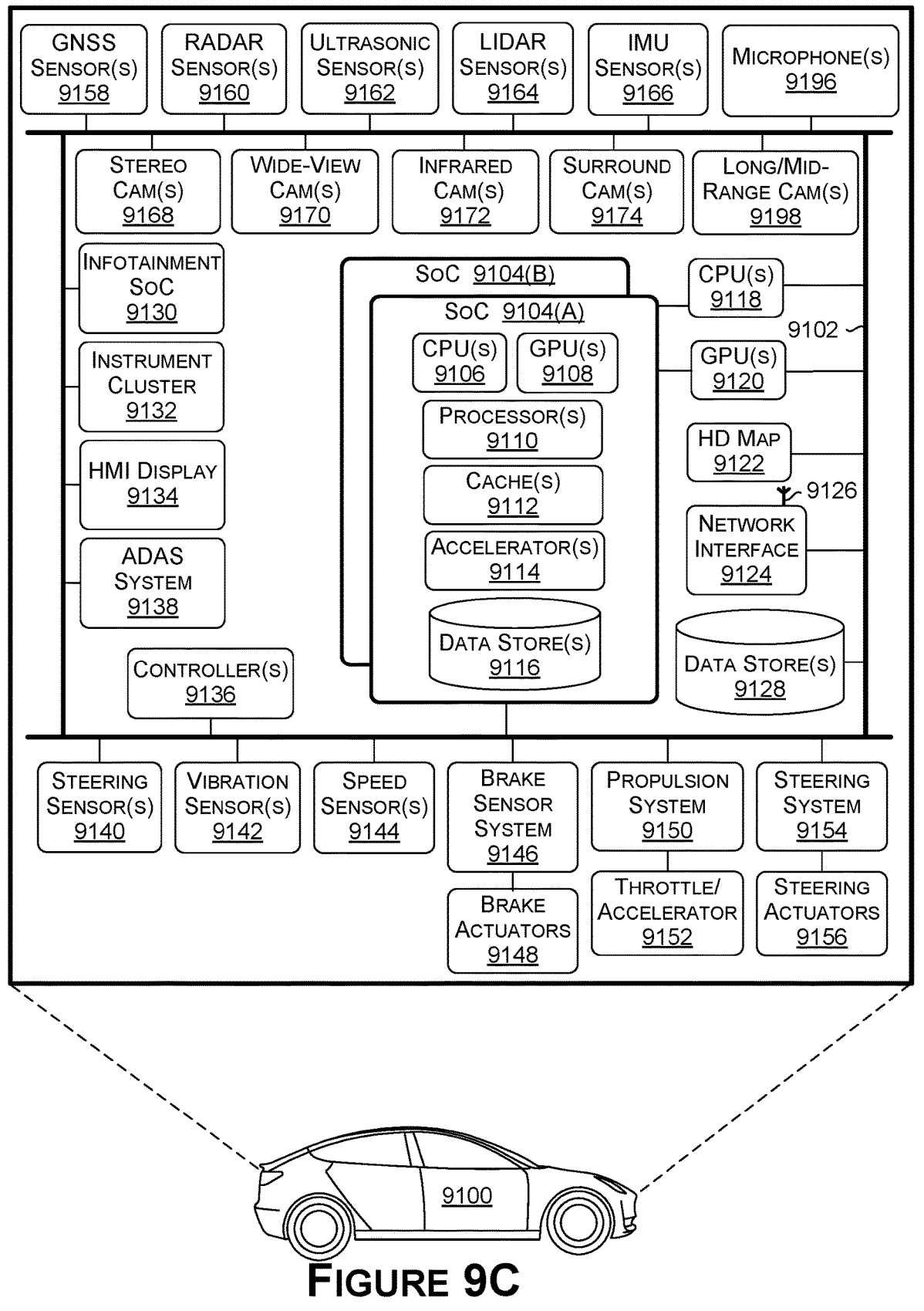
FIG. 9C is a block diagram of an example system architecture for the example autonomous vehicle of FIG. 9A, in accordance with some embodiments of the present disclosure.
Figure 9D:
FIG. 9D is a system diagram for communication between cloud-based server(s) and the example autonomous vehicle of FIG. 9A, in accordance with some embodiments of the present disclosure.

Systems and methods are disclosed for regional path planning in robotic systems and applications. Although the present disclosure can be described with respect to an example autonomous or semi-autonomous vehicle or machine 900 (alternatively referred to herein as "vehicle 900" or "ego-machine 900," an example of which is described with respect to FIGS. 9A-5D), this is not intended to be limiting. For example, the systems and methods described herein can be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure can be described with respect to robotic systems and applications, this is not intended to be limiting, and the systems and methods described herein can be used in augmented reality, virtual reality, mixed reality, robotics, security and surveillance, autonomous or semi-autonomous machine applications, and/or any other technology spaces where sensor monitoring can be used.

Figure 1:
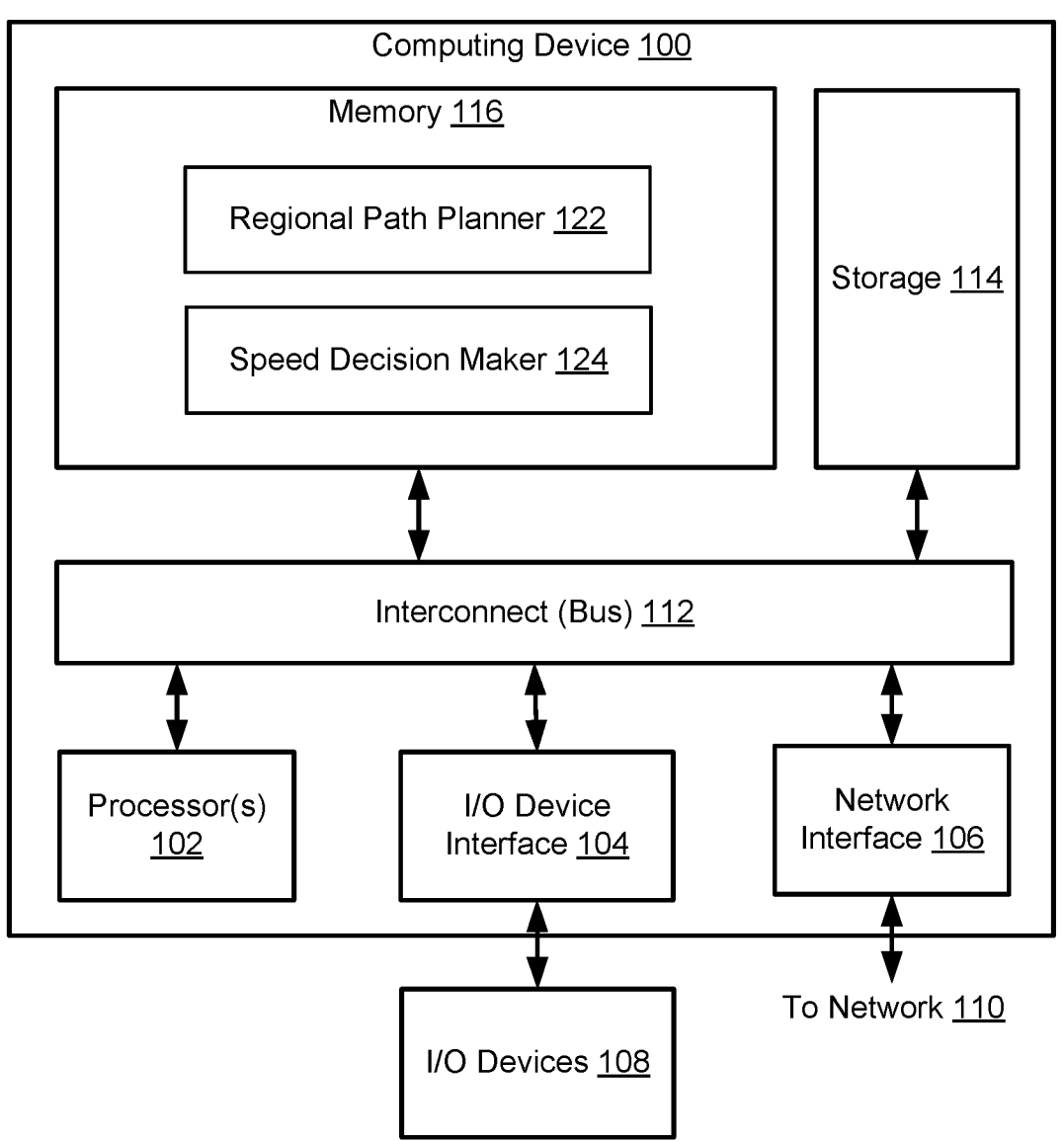
FIG. 1 illustrates a computing device configured to implement one or more aspects of various embodiments.

FIG. 1 illustrates a computing device 100 configured to implement one or more aspects of various embodiments. In at least one embodiment, computing device 100 includes a desktop computer, a laptop computer, a smart phone, a personal digital assistant (PDA), a tablet computer, a server, one or more virtual machines, an embedded system, a system on a chip, a computing system of an autonomous, semi-autonomous, or a non-autonomous machine, and/or any other type of computing device configured to receive input, process data, and optionally display information, and is suitable for practicing one or more embodiments. Computing device 100 is configured to run a regional path planner 122 and a speed decision maker 124 that can reside in a memory 116. It is noted that the computing device described herein is illustrative and that any other technically feasible configurations fall within the scope of the present disclosure. For example, multiple instances of regional path planner 122 and/or speed decision maker 124 can execute on a set of nodes in a distributed and/or cloud computing system to implement the functionality of computing device 100. Alternatively, computing device 100 can be implemented similar to that of the computing device of the example autonomous or semi-autonomous machine 500 described at least with respect to FIGS. 9A-9D.

In at least one embodiment, computing device 100 includes, without limitation, an interconnect (bus) 112 that connects one or more processors 102, an input/output (I/O) device interface 104 coupled to one or more input/output (I/O) devices 108, memory 116, a storage 114, and/or a network interface 106. Processor(s) 102 can include any suitable processor implemented as a central processing unit (CPU), a graphics processing unit (GPU), an application-specific integrated circuit (ASIC), a field programmable gate array (FPGA), an artificial intelligence (AI) accelerator, a deep learning accelerator (DLA), a parallel processing unit (PPU), a data processing unit (DPU), a vector or vision processing unit (VPU), a programmable vision accelerator (PVA), any other type of processing unit, or a combination of different processing units, such as a CPU(s) configured to operate in conjunction with a GPU(s). In general, processor(s) 102 can include any technically feasible hardware unit capable of processing data and/or executing software applications. Further, in the context of this disclosure, the computing elements shown in computing device 100 can correspond to a physical computing system (e.g., a system in a data center or a machine) and/or can correspond to a virtual computing instance executing within a computing cloud.

In at least one embodiment, I/O devices 108 include devices capable of receiving input, such as a keyboard, a mouse, a touchpad, a VR/MR/AR headset, a gesture recognition system, a steering wheel, mechanical, digital, or touch sensitive buttons or input components, and/or a microphone, as well as devices capable of providing output, such as a display device, haptic device, and/or speaker. Additionally, I/O devices 108 can include devices capable of both receiving input and providing output, such as a touchscreen, a universal serial bus (USB) port, and so forth. I/O devices 108 can be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

In at least one embodiment, network 110 is any technically feasible type of communications network that allows data to be exchanged between computing device 100 and internal, local, remote, or external entities or devices, such as a web server or another networked computing device. For example, network 110 can include a wide area network (WAN), a local area network (LAN), a wireless (e.g., WiFi) network, a cellular network, and/or the Internet, among others.

In at least one embodiment, storage 114 includes non-volatile storage for applications and data, and may include fixed or removable disk drives, flash memory devices, and CD-ROM, DVD-ROM, Blu-Ray, HD-DVD, or other magnetic, optical, or solid-state storage devices. Regional path planner 122 and/or speed decision maker 124 may be stored in storage 114 and loaded into memory 116 when executed.

In one embodiment, memory 116 includes a random-access memory (RAM) module, a flash memory unit, and/or any other type of memory unit or combination thereof. Processor(s) 102, I/O device interface 104, and network interface 106 may be configured to read data from and write data to memory 116. Memory 116 may include various software programs or more generally software code that may be executed by processor(s) 102 and application data associated with said software programs, including regional path planner 122 and/or speed decision maker 124.

Regional path planner 122 includes functionality to generate a regional path that specifies a path for the mobile robot to follow to navigate from a start waypoint toward a target waypoint while avoiding obstacles. The regional path does not necessarily end at the target waypoint. The regional path can end at a location different from the target waypoint if, for example, the target waypoint is occupied by an obstacle, or the regional path planner 122 is unable to identify a path to the target waypoint. The start and target waypoints can be locations on a global route plan that covers a longer distance than the regional path. As such, the regional path planner 122 performs path planning for individual regions that are each smaller than the area between the start and destination locations of the global route plan. The terms "route" and "path" as used herein may both refer to a sequence of locations, e.g., waypoints, that can be used by a mobile robot to navigate from a starting location, such as the current location of the mobile robot, to a target location. The term "route" is used herein for longer distances than the term "path" for explanatory purposes. A route can be represented by the same information as a path in some implementations, or by different information than a path in other implementations. Further, the terms "global," "regional," and "local" are used for explanatory purposes and do not necessarily imply specific distances or area sizes. In some examples described herein, a global route plan can cover multiple kilometers, a regional path can cover approximately 50 meters, and a local trajectory can cover approximately 5 meters, but the global route plan, regional path, and local trajectory can cover any suitable distances in other examples.

The regional path planner 122 is configured to generate a regional path for a mobile robot from input that includes a global route plan represented as a sequence of waypoints, a current location of the mobile robot, a distance map, and/or a semantic map of the physical environment of the mobile robot. The distance map can indicate the distances to obstacles in the physical environment, and can be provided by a perception system that uses sensors to identify the locations of the obstacles. The semantic map, which can be used as an alternative to or in addition to the distance map, indicates locations of static (e.g., non-moving) obstacles in the physical environment. The regional path planner 122 identifies a search space that includes at least a portion of the global route plan, e.g., a portion of the global route plan between the current location of the mobile robot and a region planning horizon. The regional planning horizon can correspond to a distance for which regional path planning is to be performed. The regional path planner 122 identifies a target waypoint in the sequence of waypoints. The target waypoint can be a farthest waypoint on the global route plan that is not beyond the planning horizon.

The regional path planner 122 uses the distance map and/or semantic map to determine whether the target waypoint is occupied by an obstacle. If the target waypoint is occupied, the regional path planner 122 identifies a replacement target waypoint. The replacement target waypoint can be identified by searching along the direction of the path or laterally to the path, e.g., in a direction perpendicular to the path at the current location of the mobile robot. The regional path planner 122 uses a path search algorithm to generate a path from the current location to the target waypoint, or to the replacement target waypoint if the target waypoint is occupied by an obstacle. If the path search algorithm is unable to find a collision-free path, the regional path planner

122 expands the search space and searches again, or requests that the global route plan be modified to use a different route, and attempts to find a collision-free path using the modified global route plan. The mobile robot can then navigate to the target waypoint via the path, and the regional path planner 122 can be used repeatedly to find next target waypoints and regional paths to the next target waypoints, until the mobile robot navigates to the end (e.g., destination waypoint) of the global route plan.

Speed decision maker 124 includes functionality to generate a set of speed directives that specify how the speed of the mobile robot is to be changed to avoid collisions with obstacles on the regional path. The speed decision maker 124 generates speed constraints using input that includes a regional path, a distance map, and/or a semantic map. The distance map and/or the semantic map indicate the locations of obstacles in the physical environment and also include semantic information about obstacles and/or about regions of the environment. The information about obstacles can include a type of each obstacle and a specification of motion of the obstacle. The information about regions can include a speed limit associated with a region, for example.

The speed decision maker 124 uses the distance map and/or semantic map to identify one or more obstacles on or near a given path in the physical environment. An obstacle is near the given path if the obstacle is within a threshold distance of the path, for example. The speed decision maker 124 generates one or more speed constraints based on characteristics of the identified obstacles. Each speed constraint is associated with one or more map regions that include at least one of the identified obstacles. The speed decision maker 124 generates one or more speed change decisions that change the speed of the robot over time, such that the determined speeds of the robot over time minimize a total cost determined by the constraints. A constraint can determine a cost if the speed of the robot exceeds a speed limit associated with the constraint when the robot is within a speed zone on or near the path during one or more specified time intervals. The speed change decisions can specify actions such as accelerating, decelerating, or stopping. Since the path is given as an input, the locations along the path at which speed constraints are to be enforced can be specified as one-dimensional distances, e.g., as start and end distances. For moving obstacles, the times during which speed constraints are to be enforced can be specified as ranges of elapsed travel time, e.g., as start and end times.

The speed decision maker 124 can cause each speed change decision to be applied to the mobile robot at a respective time. For obstacles that move over time, the constraints can specify location ranges (e.g., a portion of the path) and time ranges (e.g., a time interval) to which speed limits apply. The speed limit can be 0 to indicate that the mobile robot is to stop at particular location(s) during a particular time range. Since there can be multiple moving obstacles, multiple speed constraints can apply during the same time period and at the same location. Accordingly, a solver is used to generate speed change decisions that satisfy the speed constraints, e.g., by minimizing a total cost determined by the constraints. The solver can search a path-time space for speed profiles that satisfy the constraints, for example. The solver can alternatively or additionally divide the path-time space into discrete intervals, and search for a solution in each interval, for example. The speed change decisions generated by the speed decision maker 124 can be converted to speed directives suitable for input to a trajectory planner. The speed directives can specify speed limits that apply during particular regions and times, and the trajectory planner can generate trajectories that satisfy the speed directives.

Figure 2:
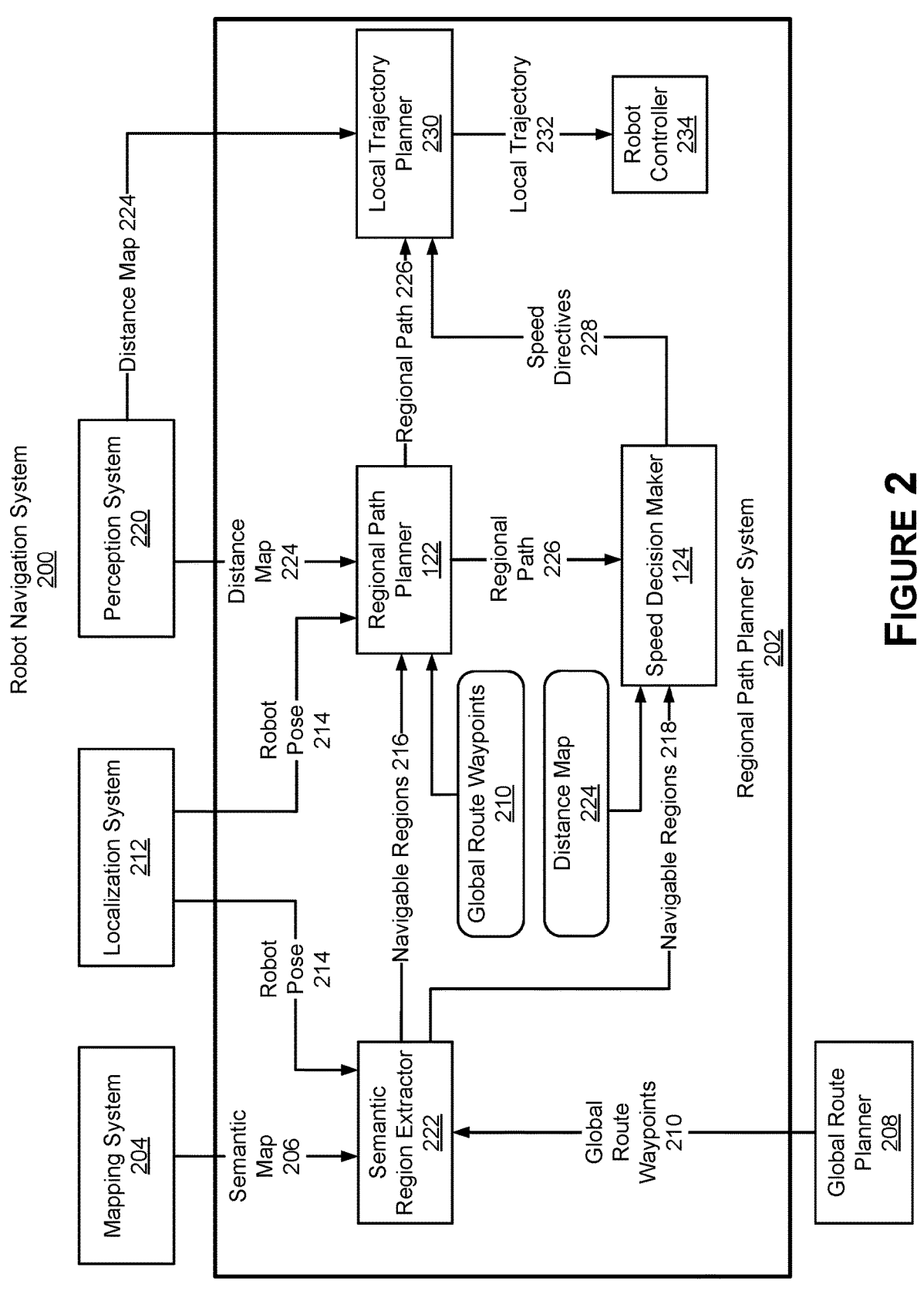
FIG. 2 illustrates a robot navigation system that includes the regional path planner and speed decision maker of FIG. 1, according to various embodiments.

FIG. 2 illustrates a robot navigation system 200 that includes the regional path planner 122 and speed decision maker 124 of FIG. 1, according to various embodiments. The robot navigation system 200. The robot navigation system 200 includes a regional path planner system 202 and system components, such as a mapping system 204, a global route planner 208, a localization system 212, and a perception system 220, which are related to robot navigation and provide input to the regional path planner system 202. One or more of the system components 204, 208, 212, 220 can be located external to a mobile robot, e.g., on a cloud-based server that communicates with the mobile robot via a communications network. The regional path planner system 202 is located on the mobile robot in examples described herein, although one or more components of the regional path planner system 202 can be external to the mobile robot in other examples. The regional path planner system 202 generates a local trajectory 232 for the mobile robot to use in navigation along a portion of a global route plan received from the global route planner 208.

The mapping system 204 provides a semantic map 206 specifying locations of obstacles and/or navigable regions in the physical environment of the mobile robot. The semantic map 206 also specifies semantic information associated with the obstacles and/or navigable regions, such as obstacle types. The semantic map 206 represents the physical environment of the mobile robot and includes semantic information about objects in the physical environment such as obstacles, which are to be avoided by the mobile robot so that collisions do not occur. The semantic map 206 includes information about static obstacles that do not move. The semantic map 206 represents the physical environment as a set of semantic regions identified by geographic coordinates or other location information.

The semantic information can include a region type that characterizes a region. A region type can be associated with each region to indicate whether the region is a navigable region, through which the robot can navigate without collision, or an obstacle to be avoided by the robot. A region type can also indicate further details about an obstacle, such as an obstacle type. Possible obstacle types include, e.g., wall, stairs, or other static (e.g., non-movable) obstacles. Other possible obstacle types include automatic door, pedestrian, vehicle, or other dynamic (e.g., movable) obstacle. For dynamic obstacles, the semantic information can further specify how the obstacle moves over time, e.g. as a range of times during which the object occupies its associated region (e.g., a closed automatic door), and/or a range of times during which the obstacle does not occupy its associated region and the robot can occupy the associated region (e.g., an open automatic door). The semantic map 206 can be represented, for example, as a graph in which nodes represent semantic regions and edges represent connections between semantic regions.

The global route planner 208 generates a global route plan between a starting point, such as the current location of the mobile robot, and a destination point. The global route plan is represented as a sequence of global route waypoints 210, which include a starting global route waypoint and a destination global route waypoint.

The localization system 212 generates localization information of the mobile robot using a localization map, which can be the semantic map 206 or other suitable map of the physical environment. The localization information includes the position (e.g., (x, y, z) coordinates) and/or orientation (e.g., rotation about the x axis, rotation about the y axis, and rotation about the z axis) of the mobile robot. The localization information is represented as a robot pose 214. The robot pose 214 specifies the location and/or orientation of the mobile robot in the physical environment. The localization system 212 uses sensors located on the mobile robot to identify distances to and locations of objects in the physical environment, and uses the distances and locations to find the location of the mobile robot on the localization map. The sensors can include, e.g., camera(s), RADAR, LiDAR, and/or the like.

The perception system 220 generates a distance map 224 using sensors located on the mobile robot, e.g., camera(s), RADAR, LiDAR, and/or the like. The distance map 224 provides locations of obstacles within detection range of the sensors. The distance map 224 can be a grid-based representation of the physical environment in which the mobile robot is located. The obstacle locations provided by the distance map 224 can include locations of obstacles that are not necessarily present in the semantic map 206, such as dynamic obstacles that move over time and are identified in real time, e.g., during navigation of the mobile robot.

The regional path planner system 202 includes a semantic region extractor 222, the regional path planner 122 and the speed decision maker 124 of FIG. 1, a local trajectory planner 230, and a robot controller 234. The semantic region extractor 222 identifies one or more navigable regions 216 that intersect the global route and/or are within a threshold distance of the global route using input that includes the navigable regions 216, the robot pose 214, and the global route waypoints 210. At least one of the navigable regions 216 includes the mobile robot so that the mobile robot can reach the path by navigating through the navigable regions 216. For example, the global route planner 208 can have a planning horizon of more than 100 meters up to multiple kilometers. A global route can be generated once per robot mission. The semantic region extractor 222 can have a planning horizon of approximately 100 meters, e.g., greater than a sensor detection range, and can operate at a frequency such as 1 cycle per second, where each cycle corresponds to an invocation of the semantic region extractor 222. The regional path planner 122 can have a planning horizon of approximately 50 meters, e.g., the sensor detection range, and can operate at a frequency such as 1 cycle per second, where each cycle corresponds to an invocation of the regional path planner 122. The local trajectory planner 230 can have a planning horizon of approximately 5 meters and can operate at a frequency such as 10 cycles per second, where each cycle corresponds to an invocation of the local trajectory planner 230.

The regional path planner 122 generates a regional path 226 using input that includes the navigable regions 216 identified by the semantic region extractor 222, the robot pose 214, and the distance map 224. The regional path 226 can include a sequence of waypoints of a path to be followed to navigate from a current location of the mobile robot to a next waypoint of the global route waypoints 210, if such a path can be found. If the regional path planner 122 does not find such a path, the regional path planner 122 can identify a different destination waypoint or request that the global route planner 208 generate a different global route plan and provide corresponding different global route waypoints 210. The regional path planner 122 uses a path solver algorithm, e.g., the A* algorithm or the like, to find the regional path 226.

The speed decision maker 124 generates one or more speed directives 228 using input that includes the distance map 224, the navigable regions 216, and the regional path. The navigable regions 216 can be map(s), e.g., portions of the semantic map 206, that represent regions of the physical environment. The navigable regions 216 include regions of the physical environment in which the mobile robot is permitted to navigate without constraints. The navigable regions 216 can also include speed zones that are associated with speed limits. Speed zones can be regions that include stairs, doorways, ramps, annotated high-risk areas, or the like, for example. The speed limit associated with a zone can be zero to indicate that navigation in the speed zone is prohibited. The distance map 224 identifies obstacles, and the speed decision maker 124 identifies which of the obstacles are on or near (e.g., within a threshold distance of) the regional path 226. The distance map 224 can include semantic information associated with the obstacles, such as obstacle types. Alternatively or additionally, the speed decision maker 124 can also use the semantic map 206 to identify speed zones and/or obstacles on or near the regional path 226 and semantic information associated with the obstacles.

The speed directives 228 specify speed changes at particular times and/or distances, such as acceleration, deceleration, stopping, and so on. The speed directives 228 represent a "speed profile," in which is a specification of speed over time (e.g., a function that represents values of speed over a time range). Since the obstacles on the regional path 226, such as pedestrians, automatic doors, and so on, can move while the mobile robot is traversing the regional path 226, there can be a number of possible local optimums that correspond to different potential choices for the speed profile. The speed decision maker 124 can evaluate these possible local optimums and identify one that best satisfies criteria such as minimizing travel time, minimizing travel distance, or other criteria.

The local trajectory planner 230 generates a local trajectory 232 using input that includes the regional path 226 and the speed directives 228. The local trajectory planner 230 uses optimization techniques to generate the local trajectory 232 by optimizing the regional path 226 and/or the speed directives 228. If both the regional path 226 and the speed directives 228 are provided as input to the local trajectory planner 230, the local trajectory planner 230 optimizes the regional path 226 and the speed directives 228 jointly to generate the local trajectory 232. The local trajectory 232 can differ from the regional path 226 and speed directives 228 because the optimizations may change the waypoints of the regional path 226 and/or the speed directives 228. The local trajectory 232 can be a sequence of points (e.g., waypoints), for example. The robot controller 234 causes the robot to navigate in the physical environment according to the local trajectory 232, e.g., by actuating wheels and/or other components of a drive train.

Figure 3:
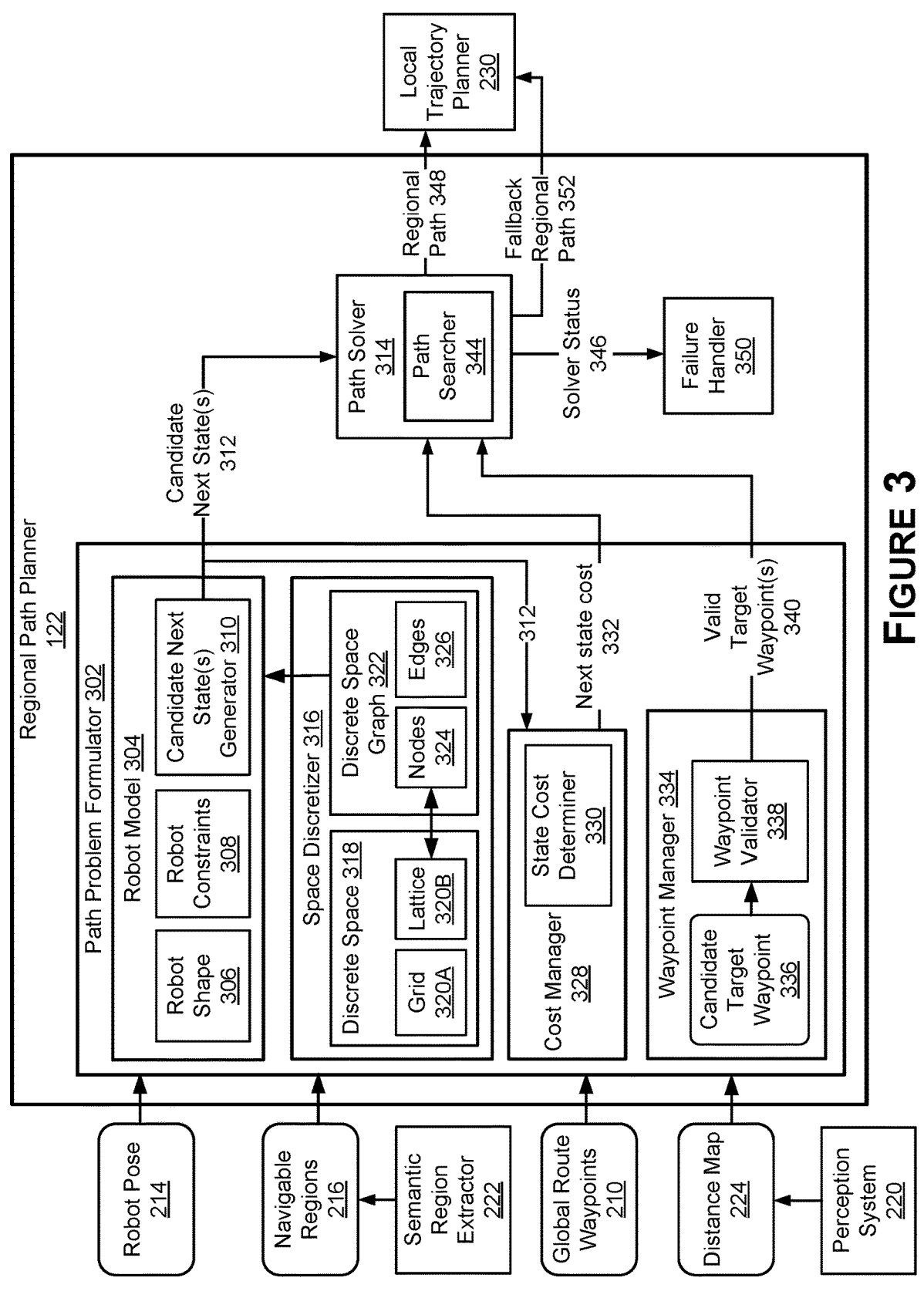
FIG. 3 is a more detailed illustration of the regional path planner of FIG. 1, according to various embodiments.

FIG. 3 is a more detailed illustration of the regional path planner 122 of FIG. 1, according to various embodiments. The regional path planner 122 planner generates a regional path 348 from a current location of the mobile robot to a destination based on a next waypoint in a sequence of global route waypoints 210. The regional path planner 122 includes a path problem formulator 302, a path solver 314, and a failure handler 350. The path problem formulator 302 generates solver input to be provided to the path solver 314. The solver input includes one or more candidate next states 312 for the mobile robot. The term "state" is used herein to refer to a location, or a move or motion that causes the mobile robot to travel to the location. Accordingly, the candidate next state(s) 312 identify potential next locations for the mobile robot. The solver input also includes a next state cost 332 for each candidate next state 312, and a valid target waypoint 340, which represents a candidate destination for the regional path 348. The path solver 314 attempts to generate a regional path 348 using the solver input.

If the path solver 314 successfully generates a regional path 348, then the regional path 348 is provided to the local trajectory planner 230. If the path solver 314 is unable to generate a regional path 348, e.g., because the possible paths are occupied by obstacles, then a failure handler 350 attempts to generate a fallback regional path 352. If the failure handler 350 is unable to generate a fallback regional path 352, e.g., by expanding the size of the search space, then the failure handler 350 can request that the global route plan be re-generated (e.g., re-routed), and the regional path planner 122 can use the path solver 314 to attempt to find a fallback regional path 352 using a different sequence of global route waypoints 210.

The path problem formulator 302 uses the robot model 304, space discretizer 316, cost manager 328, and waypoint manager 334 to generate the solver input. The robot model 304 provides information about properties of the robot, including a robot shape 306, available motion operations, and one or more robot constraints 308. The robot constraints 308 include maximum speed, maximum acceleration, and so on. The robot model 304 also includes a candidate next state generator 310, which generates candidate next state(s) 312 based on the robot constraints 308 and a discretized space 318. The space discretizer 316 generates the discreted space 318 by dividing the navigable regions 216 into smaller regions such as cells. The size of each cell is determined by a discretization resolution. The discreted space 318 is associated with a coordinate system in which locations in the discretized space 318 can be identified by coordinate values. The discretization resolution can be used to convert between coordinate values and distances in the physical environment. The coordinate system can be a Cartesian coordinate system or a Frenet coordinate system, for example. If a Cartesian coordinate system is used, the discretized space 318 can be implemented as a two-dimensional grid 320A that divides the space into square (or rectangular) cells. The grid 320A has an x axis and a y axis. Each cell is identified by an (x, y) coordinate pair that specifies a location of the cell relative to the origin of the coordinate system. The space discretizer 316 can generate the grid 320A by dividing the navigable regions 216 into a number of rectangular cells, which form the grid 320A.

If the Frenet coordinate system is used, the discretized space 318 can be implemented as a two-dimensional lattice 320B that divides the space into cells. A location in Frenet coordinates has an (s, d) coordinate pair, where s specifies a longitudinal displacement along a reference path and d specifies a lateral displacement from the reference path. In other words, the s coordinate specifies a distance along the reference path (such as the global route plan that passes through the global route waypoints 210). The d coordinate specifies a side-to-side position relative to the reference path on an axis perpendicular to the reference path at the distance specified by the s coordinate of an (s, d) pair. Each cell can be identified by an (s, d) coordinate pair that specifies the location of the cell relative to a starting point on the reference path (e.g., relative to s=0).

The space discretizer 316 also generate a discretized space graph 322, which includes a set of nodes 324 that correspond to locations in the discretized space 318. For example, each node 324 can correspond to one or more cells of the cell grid 320 of the discretized space 318. The discretized space graph 322 also includes a set of edges 326. Each edge 326 connects a pair of nodes 324 that correspond to adjacent cells of the discretized space 318. Adjacent cells represent locations that are adjacent in the physical environment. That is, an edge 326 that connects two nodes 324 in the discretized space graph 322 indicates that the mobile robot can navigate between the locations represented by the two nodes 324 (at least if the destination location is not occupied).

The candidate next state generator 310 uses the discretized space graph 322 to identify the candidate next states 312 for the mobile robot. The candidate next state(s) 312 can include robot motions or instructions that specify how the mobile robot is to move to navigate to a candidate location. The candidate location can be represented as a node 324 of the discretized space graph 322, and corresponds to a cell of the discretized space 318. Alternatively or additionally, the candidate next state(s) 312 can include the candidate locations. For example, the candidate next state(s) 312 can include nodes 324 that represent the candidate locations.

The candidate next state generator 310 generates the candidate next state(s) 312 by finding nodes 324 in the discretized space graph 322 that represent possible next states for the mobile robot. To generate each candidate next state 312, the candidate next state generator 310 searches the discretized space graph 322 to identify nodes 324 representing locations that are between a current location of the mobile robot and a next global route waypoint of the global route waypoints 210. The next global route waypoint is a next one of the global route waypoints 210 that is past the current location of the mobile robot in the direction of the destination (e.g., end) global route waypoint. The candidate next state generator 310 verifies that the transition to each of the identified nodes 324 is valid, e.g., that the mobile robot can move to the location represented by the identified node 324 without violating the robot constraints 308, and that the identified node 324 is not occupied by an obstacle. For each identified node 324 that is valid, the candidate next state generator 310 generates a candidate next state 312. The candidate next state(s) 312 can include robot motions or instructions that specify how the mobile robot is to move to navigate to a candidate location. Alternatively or additionally, the candidate next state(s) 312 can include the candidate locations.

The cost manager 328 computes a next state cost 332 for each candidate next state(s) 312. The next state cost 332 is computed based on navigation objectives, which include robot kinematics objectives, global route guidance objectives, and/or obstacle avoidance objectives. The next state cost 332 is computed as a sum of robot kinematics costs, global route guidance costs, obstacle avoidance costs, and/or other costs that can be computed, e.g., by extensions to the cost manager.

The robot kinematics costs penalize infeasible motions. The goal of the robot kinematics costs is to minimize the discrepancy between the regional path 348 and the local trajectory 232 generated by the local trajectory planner 230. The penalized motions can include lateral acceleration and jerk (e.g., rate of change of acceleration over time). Infeasible lateral acceleration and jerk can be penalized by using the maximum speed and acceleration provided by the robot model 304 to approximate the speed profile.

The global route guidance cost encourages the robot to stay on the global route plan specified by the global route waypoints 210. The global route guidance cost can be based on the distance to the global route plan, which can be calculated by generating a distance map for the global route plan represented by the global route waypoints 210. The global route plan could be infeasible with respect to real-time obstacles. Accordingly, the penalty imposed by the global route guidance cost should be relatively small, such that the mobile robot can properly avoid obstacles by deviating from the global route plan. However, the mobile robot should not move too far away from the global route plan, as it might lose sight of the global guidance (e.g., landmark obstacles). As such, a limit can be imposed on the amount of deviation from the global route plan.

The costs computed for obstacle avoidance objectives penalize obstacle collisions. For example, obstacle avoidance objectives can incur a high cost for grid areas occupied by obstacles. The regional path planner 122 obtains obstacle information from the navigable regions 216 and/or from the distance map 224 provided by the perception system 220, and computes costs for the obstacles based on distances to the obstacles. The obstacle locations are provided by the navigable regions 216 and/or the distance map 224, e.g., as obstacle polygons. The distance to an obstacle can be computed as the distance between the polygon and the node 324 in which the mobile robot is currently located.

The waypoint manager 334 generates a valid target waypoint 340, which is provided to the path solver 314 for use as a destination of the regional path 348. To generate the valid target waypoint 340, the waypoint manager 334 searches the global route waypoints 210 for a candidate target waypoint 336, which can be a waypoint in the global route waypoints 210 that is between the current location of the mobile robot and the final destination waypoint of the global route waypoints 210. The waypoint manager 334 uses a waypoint validator 338 to determine whether the candidate target waypoint 336. The waypoint validator 338 determines that the candidate target waypoint 336 is valid if the location represented by the candidate target waypoint 336 is not occupied by an obstacle or other obstruction, and is within a planning horizon. The planning horizon can correspond to the sensor detection range of the mobile robot, for example.

If the waypoint validator 338 determines the candidate target waypoint 336 is valid, then the waypoint manager 334 outputs the target waypoint 336 as a valid target waypoint 340. If the waypoint validator 338 determines that the candidate target waypoint 336 is invalid, then the waypoint manager 334 searches for a replacement target waypoint, e.g., using a longitudinal search and/or a lateral search for a valid "point" along the global route plan or lateral to the global route plan. The term "point" as used herein can refer to a location or region in the discretized space 318, e.g., a cell on a grid 320A or lattice 320B. A point can correspond to an amount of space represented by a cell of the discretized space 318, for example. The global route waypoints 210 are examples of points. The components of the regional path planner 122, such as the waypoint manager 334 and/or the path solver 314, can select points that are not included in the global route waypoints 210 and use the selected points in at least a portion of the regional path. For example, if one of the global route waypoints 210 is occupied by an obstacle, the waypoint manager 334 finds a different point and uses the different point as a target waypoint 340 for the regional path 348. Accordingly, the replacement target waypoint can be one of the global route waypoints 210, or another valid point that is not one of the global route waypoints 210. As an example, the replacement target waypoint can be the first valid point found by searching in a longitudinal and/or lateral direction from the invalid candidate target waypoint 336. The replacement target waypoint can be the first such valid point found by the search. If a valid point is not found, e.g., there are no valid points along the global route plan starting from the invalid candidate target waypoint 336 in the longitudinal direction, and no valid points in a lateral direction, then waypoint manager 334 reports a failure.

To perform a longitudinal search, the waypoint manager 334 starts from the invalid candidate target waypoint 336 and searches the points along the global route plan until the first valid point is found. The first valid point found, if any, is used as the replacement target waypoint 336. The longitudinal search approach is likely to progress toward the destination, but can also cause repetitive searching when a valid point is located beyond the planning horizon. To perform a lateral search, the waypoint manager 334 starts from the invalid candidate target waypoint 336 and searches along a direction perpendicular to the route plan until the first valid point is found. The first valid point found, if any, is used as the replacement target waypoint 336. The lateral search approach can help ensure that the identified valid point is within the planning horizon, but could introduce larger deviations from the original global route plan than the longitudinal search approach. The waypoint manager 334 outputs the replacement target waypoint, if found, as the valid target waypoint 340. The waypoint manager 334 reports a failure if a valid target waypoint 340 is not found.

The path problem formulator 302 provides the candidate next state(s) 312, the next state cost 332, and the valid target waypoint 340 to the path solver 314. The path solver 314 uses a path searcher 344 to search for a regional path 348 from a current location of the mobile robot to the valid target waypoint 340 via the candidate next state(s) 312. The path searcher 344 can use a path searching algorithm such as the A* algorithm, which uses a heuristic based on Euclidean distance to the valid target waypoint 340. Alternatively or additionally, the path searcher 344 can use a bidirectional A* algorithm, a weighted A* algorithm, a D* Lite algorithm, or other suitable path searching algorithm.

If the path searcher 344 successfully finds a regional path 348, then the regional path 348 is provided to the local trajectory planner 230. If the path searcher 344 is unable to find a regional path 348, e.g., because the possible paths are occupied by obstacles, then the path solver 314 provides a solver status 346 indicating a failure to the failure handler 350. Upon receiving the solver status 346 indicating failure, the failure handler 350 attempts to cause the path solver 314 to generate a fallback regional path 352. The failure handler 350 can expand the search space and use the path solver 314 to search the expanded search space for a fallback regional path 352. Alternatively, the failure handler 350 can use the global route planner 208 to generate a new global route plan having one or more new global route waypoint(s) 210. The path problem formulator 302 generates adjusted solver input based on the new global route waypoint(s) 210. The adjusted solver input includes new candidate next state(s) 312, a new next state cost 332, and a new valid target waypoint 340. The path solver 314 then attempts again to find a fallback regional path 352 using the adjusted solver input. If the fallback regional path 352 is successfully generated, the failure handler 350 provides the fallback regional path 352 to the local trajectory planner 230. The local trajectory planner 230 uses the regional path 348 or fallback regional path 352 to generate a local trajectory 232 for the mobile robot to follow. The local trajectory 232 can be a sequence of points in 2D or 3D space, for example.

Figure 4A:
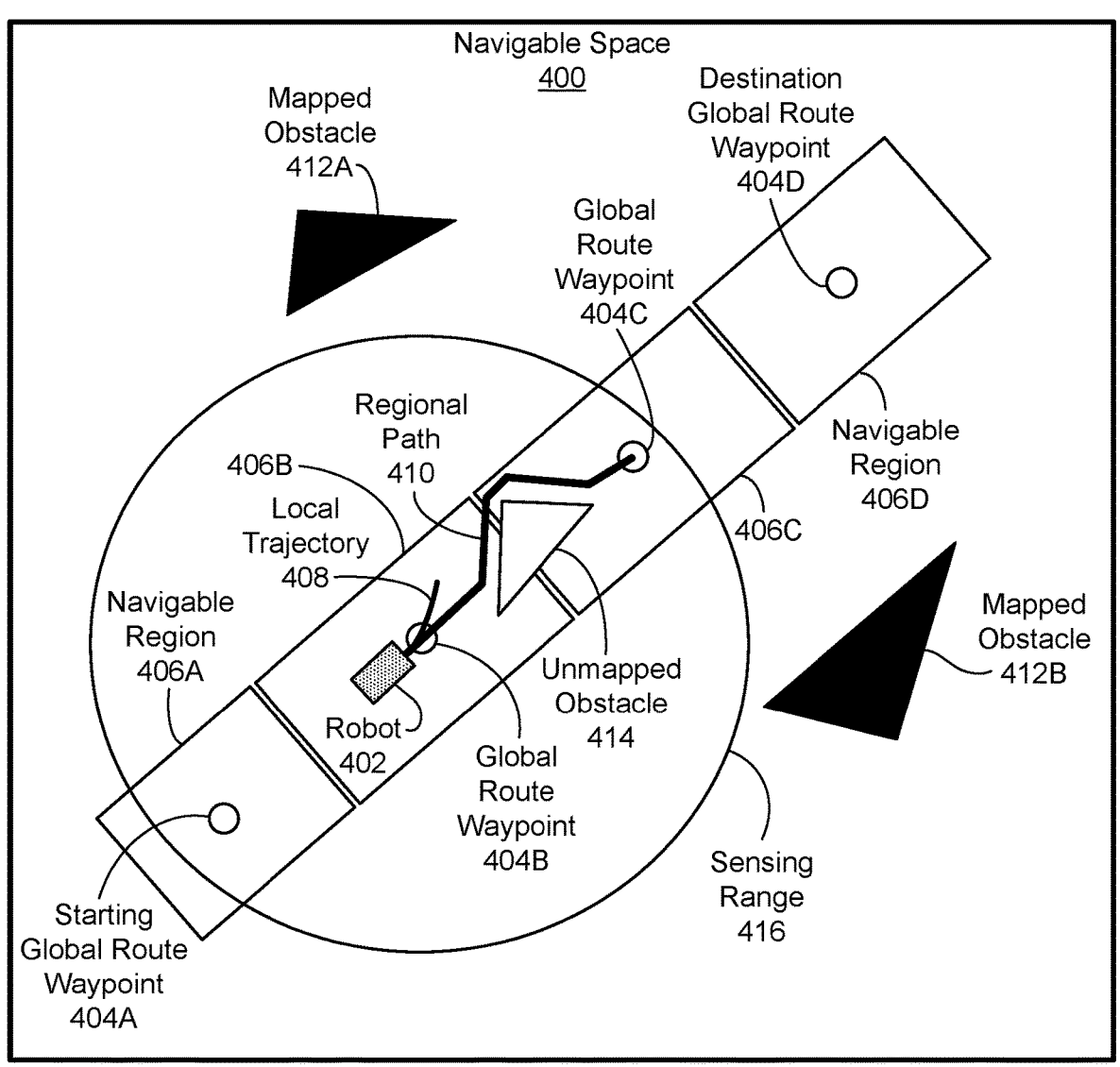
FIG. 4A illustrates a navigable space that includes a mobile robot, waypoints, obstacles, and a regional path between waypoints, according to various embodiments.

FIG. 4A illustrates a navigable space 400 that includes a mobile robot 402, global route waypoints 404, obstacles 414, 414, and a regional path 410 between global route waypoints 404, according to various embodiments. A global route plan from a starting point to a destination point is represented by a starting global route waypoint 404A, intermediate global route waypoints 404B, 404C, and a destination global route waypoint 404D. Each global route waypoint 404A, 404B, 404C, 404D is located in a respective navigable region 406A, 406B, 406C, 406D. A mobile robot 402 is located in the navigable region 406B. The mobile robot 402 has a sensing range 416 shown as a circle centered on the mobile robot 402. Mapped obstacles 412A, 412B are located outside the navigable regions 406. The locations and boundaries of the mapped obstacles 412 are identified from a semantic map 206. An unmapped obstacle 414 is located in navigable regions 4046B and 406C. The location and boundaries of the unmapped obstacle 414 are provided by a distance map 224. A regional path 410 has been generated for the mobile robot 402. A local trajectory 408 has also been generated, e.g., based on the regional path 410 or on a previous regional path (not shown). The regional path 410 is from the location of the mobile robot 402 to the global route waypoint 404C, which is near the limit of the sensing range 416. The regional path 410 is from the location of the mobile robot 402 to a destination waypoint, which can be a global route waypoint 404, that is within or near the sensing range 416 so that unmapped obstacles 414 detected by sensors are avoided by the regional path planner 122 in generating the regional path 410.

Figure 4B:
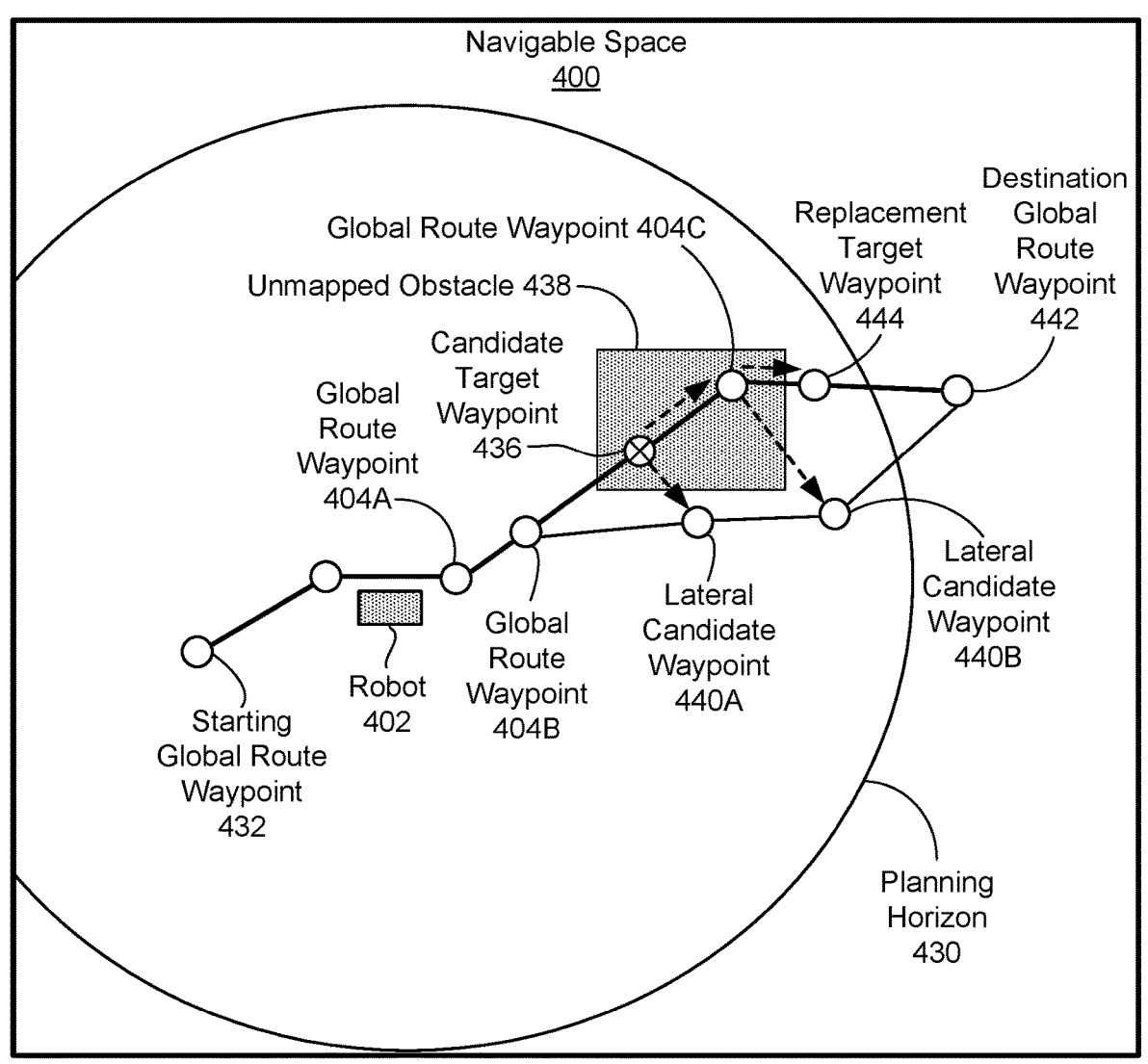
FIG. 4B illustrates a navigable space in which a target waypoint is invalid and candidate waypoints are identified as potential replacements for the invalid waypoint, according to various embodiments.

FIG. 4B illustrates a navigable space 400 in which a target waypoint 436 is invalid and candidate waypoints 440 are identified as potential replacements for the invalid waypoint, according to various embodiments. A global route plan is represented by sequence of waypoints including a starting global route waypoint 432, global route waypoints 404A, 404B, and a destination global route waypoint 442 received from a global route planner 208. A mobile robot 402 has navigated along a portion of the global route plan and is located between the starting global route waypoint 432 and the global route waypoint 404A. The mobile robot 402 has a planning horizon 430, beyond which planning is not performed because of a limited sensing range. The regional path planner 122 attempts to find a regional path from the location of the mobile robot 402 toward the destination global route waypoint 442. The regional path planner 122 can evaluate global route waypoints 404 received from a global route planner 208 and other points to find a valid target waypoint 340 to provide to a path solver 314 that generates a regional path 348.

In the example of FIG. 4B, the regional path planner 122 has identified a candidate target waypoint 436 as described herein with respect to FIG. 3. The waypoint validator 338 determines whether the candidate target waypoint 436 is valid. Since the candidate target waypoint 436 is occupied by an unmapped obstacle 438, the waypoint validator 338 determines that the candidate target waypoint 436 is invalid, and searches for a replacement target waypoint by performing a longitudinal search and/or a lateral search. The longitudinal and lateral searches can start at the invalid target waypoint 436. Alternatively, the longitudinal and/or lateral searches can start at a point on the global route plan that is past the location of the mobile robot 402 and precedes the invalid target waypoint 436. The search attempts to find one or more valid points that are closer to the destination global route waypoint 442 than is the current location of the mobile robot 402. That is, the search attempts to find valid points that enable the mobile robot 402 to make progress toward the destination global route waypoint 442. The longitudinal search is along the global route plan toward the destination global route waypoint 442. The lateral search is perpendicular to the global route plan at the invalid target waypoint 436 and is toward the destination global route waypoint 442, so that progress can be made toward the destination global route waypoint 442.

In some embodiments, upon determining that the target waypoint 436 is invalid, the waypoint manager 334 searches for valid points longitudinally and laterally along the global route plan starting from the invalid target waypoint 436. The longitudinal search proceeds along the global route plan as shown by an initial arrow from the target waypoint 436 to the global route waypoint 404C, and by a further arrow from the global route waypoint 404C toward the destination global route waypoint 442. There are no valid points on the route segment between the target waypoint 436 and the global route waypoint 404C, since that segment is within the unmapped obstacle 438. There are valid points on the route segment between the global route waypoint 404C and the destination global route waypoint 442. The valid points are between the unmapped obstacle 438 and the planning horizon 430. The waypoint manager 334 identifies a valid point shown as replacement target waypoint 444. The waypoint manager 334 can use the replacement target waypoint 444 as a valid target waypoint 340 to provide to the path solver 314.

In some embodiments, upon determining that the target waypoint 436 is invalid, the waypoint manager 334 performs a lateral search for valid points starting from the invalid candidate target waypoint 436. The lateral search proceeds in a direction perpendicular to the global route plan at the invalid candidate target waypoint 436 as shown by an arrow from the invalid candidate target waypoint 436 to the lateral candidate waypoint 440A. The lateral candidate waypoint 440A is a valid point because it is not occupied by an obstacle and is within the planning horizon 430. The waypoint manager 334 can use the lateral candidate waypoint 440A as a valid target waypoint 340 to provide to the path solver 314.

In some embodiments, upon determining that the target waypoint 436 is invalid, the waypoint manager 334 performs a longitudinal search from the invalid candidate target waypoint 436 to the global route waypoint 404C, then performs a lateral search from the global route waypoint 404C, which proceeds in a direction perpendicular to the global route plan at the global route waypoint 404C as shown by an arrow from the global route waypoint 404C to the lateral candidate waypoint 440B. The lateral candidate waypoint 440B is a valid point because it is not occupied by an obstacle and is within the planning horizon 430. The waypoint manager 334 can use the lateral candidate waypoint 440A as a valid target waypoint 340 to provide to the path solver 314.

Figure 5:
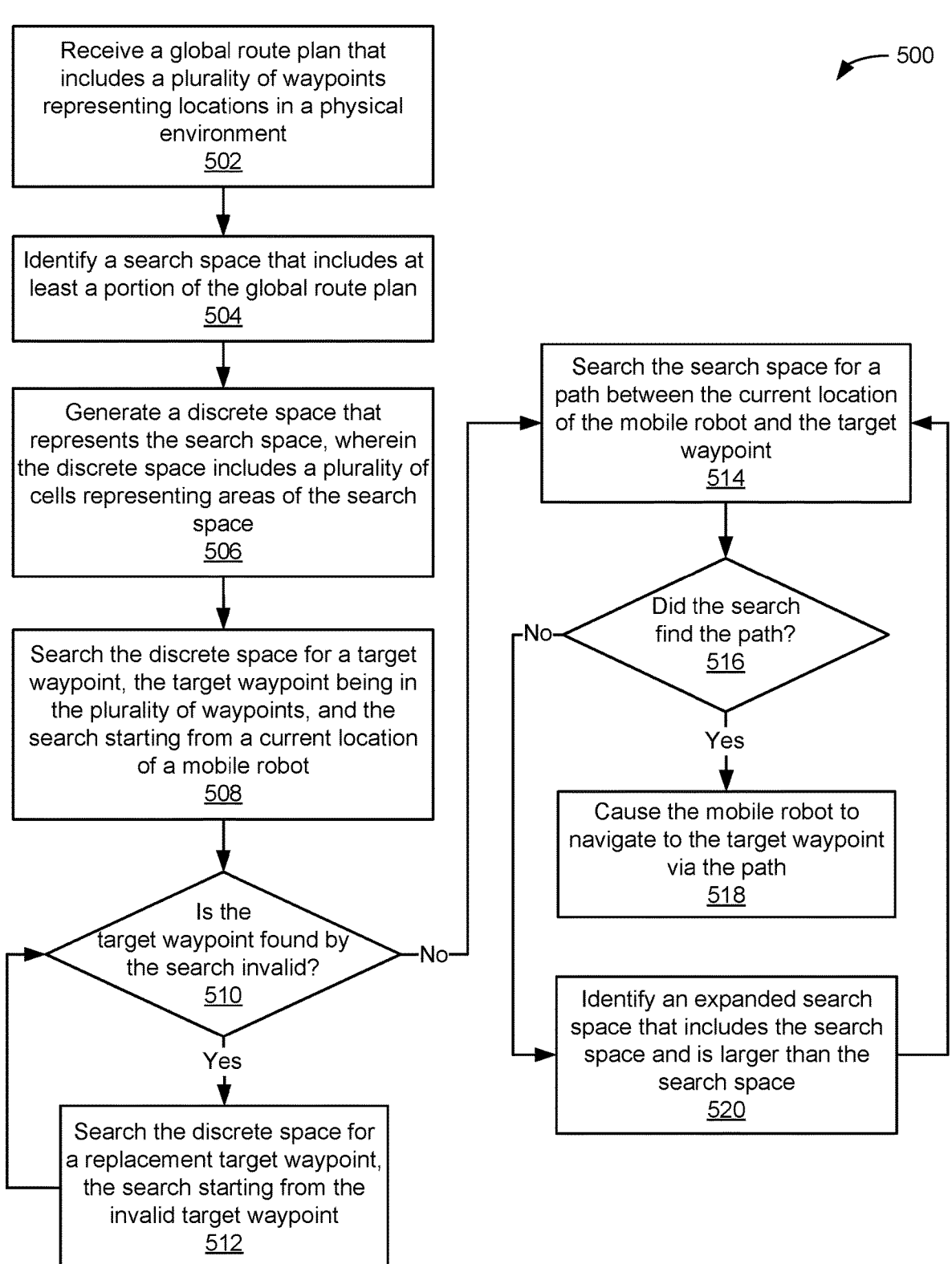
FIG. 5 illustrates a flow diagram of a method for generating a regional path, according to various embodiments.

Now referring to FIG. 5, each block of method 500, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 500 is described, by way of example, with respect to the system of FIGS. 1-3 and 6. However, this method may additionally or alternatively be executed by any one system, or any combination of systems, including, but not limited to, those described herein. Further, the operations in method 500 may be omitted, repeated, and/or performed in any order without departing from the scope of the present disclosure.

FIG. 5 illustrates a flow diagram of a method 500 for generating a regional path, according to various embodiments. As shown in FIG. 5, method 500 begins with operation 502, in which a regional path planner 122 receives a global route plan that includes a plurality of waypoints 210 representing locations in a physical environment. In operation 504, the regional path planner 122 identifies a search space that includes at least a portion of the global route plan. The search space can be the navigable regions 216, which include at least a portion of the global route waypoints 210 that form the global route plan. In operation 506, the regional path planner 122 generates a discretized space 318 that represents the search space, where the discretized space 318 includes a plurality of cells representing areas of the search space. The discretized space 318 can be generated by the space discretizer 316 from the navigable regions 216. The discretized space 318 includes a grid 320A or lattice 320B representing areas of the discretized space 318.

In operation 508, the regional path planner 122 searches the discretized space 318 for a target waypoint of the plurality of waypoints. The search starts from a current location of a mobile robot. For example, the waypoint manager 334 can search the global route waypoints 210 for a candidate target waypoint 336. The candidate target waypoint 336 can be a waypoint in the global route waypoints 210 that is between the current location of the mobile robot and the final destination waypoint of the global route waypoints 210.

In operation 510, the regional path planner 122 determines whether the target waypoint found by the search is invalid. The target waypoint is invalid if, for example, it is occupied (e.g., by an obstacle) or is at a distance from the mobile robot greater than a planning horizon. If operation 510 determines that the target waypoint found by the search is invalid, then in operation 512, the regional path planner 122 searches the discretized space for a replacement target waypoint. The search starts from the invalid target waypoint. After performing operation 512, the regional path planner 122 performs operation 510 again to determine whether the replacement target waypoint is invalid.

If operation 510 determines that the target waypoint found by the search is valid, then the regional path planner 122 performs operation 514. In operation 514, the regional path planner 122 searches the search space for a path between the current location of the mobile robot and the target waypoint. For example, a path solver 314 uses a path searcher 344 to search for a regional path 348 to a valid target waypoint 340 via one or more candidate next state(s) 312 provided by a candidate next state generator 310.

In operation 516, the regional path planner 122 determines whether the search performed in operation 514 found a path. If operation 516 determines that the search found the path, then the regional path planner 122 performs operation 518. At operation 518, the regional path planner 122 causes the mobile robot to navigate to the target waypoint via the path.

If operation 516 determines that the search did not find a path, when the regional path planner 122 performs operation 520. At operation 520, the regional path planner 122 identifies an expanded search space that includes the search space and is larger than the search space. Subsequent to performing operation 520, the regional path planner 122 performs operation 514 again to search for another path. Upon determining that operation 516 found another path, the regional path planner 122 performs operation 518 to cause the mobile robot to navigate to the target waypoint via the path.

Figure 6:
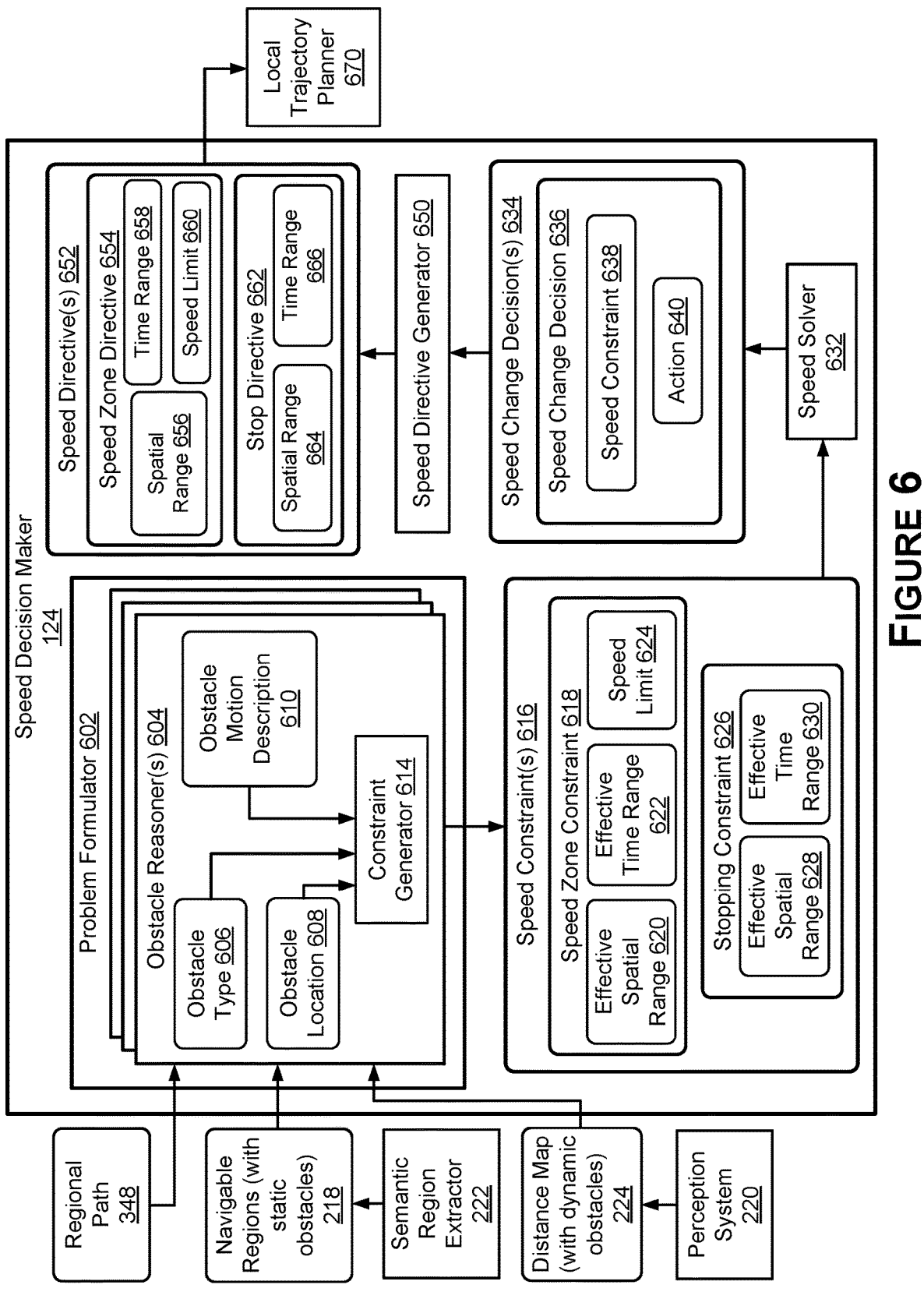
FIG. 6 is a more detailed illustration of the speed decision maker of FIG. 1, according to various embodiments.

FIG. 6 is a more detailed illustration of the speed decision maker 124 of FIG. 1, according to various embodiments. The speed decision maker 124 generates a set of speed directives 652 that specify how the speed of a mobile robot is to be changed to avoid collisions with obstacles as the mobile robot navigates along a regional path 348. The speed decision maker 124 generates speed constraints 616 using input that includes a path such as a regional path 348, a distance map 224, and/or navigable regions 218 extracted from a semantic map 206.

The distance map 224 and/or the navigable regions 218 indicate the locations of obstacles in the physical environment and also include semantic information about obstacles and/or about regions of the physical environment. The navigable regions 218 identify locations of static (e.g., stationary) obstacles and/or speed zones that are associated with speed limits. The distance map 224 identifies the locations of dynamic (e.g., moving or changing) obstacles. The semantic information about obstacles can include a type of each obstacle and a specification of motion of the obstacle. The semantic information about regions can include a speed limit associated with a navigable region 218, for example.

The speed decision maker 124 includes a problem formulator 602, a speed solver 632, and a speed directive generator 650. The problem formulator 602 generates one or more speed constraints 616, which represent a speed problem. The speed solver 632 solves the speed problem by generating one or more speed change decisions 634 for the speed constraints 616. The speed change decisions 634 specify speed changes that are to occur at specified times during navigation. The speed change decisions 634 represent a speed profile satisfying the speed constraints 616.

The speed decision maker 124 uses one or more obstacle reasoners 604 to generate one or more speed constraints 616 based on characteristics of the identified obstacles. Each obstacle reasoner 604 is associated with one or more particular types of obstacle and includes a constraint generator 614 that generates speed constraints 616 for the associated obstacle type(s). Each obstacle reasoner 604 uses the distance map 224 and/or navigable regions 218 to identify one or more obstacles that are of the obstacle type(s) 606 handled by the respective obstacle reasoner 604 and are on or near a given regional path 348 in the physical environment. An obstacle is near the given regional path 348 if the obstacle is within a threshold distance of the regional path 348, for example. When an obstacle reasoner 604 that handles obstacles of a particular obstacle type 606 identifies an obstacle of the particular obstacle type 606 in the navigable regions 218 or distance map 224, and the obstacle location 608 specified for the obstacle in the navigable regions 218 or distance map 224 is on or near the regional path 348, the obstacle reasoner 604 provides the obstacle location 608 of the obstacle and an obstacle motion description 610 of the obstacle (if present) to a constraint generator 614 that generates speed constraints 616 for obstacles of the particular obstacle type 606.

The speed constraints 616 generated by the obstacle reasoners 604 can include a speed zone constraint 618, a stopping constraint 626, and/or other constraints that specify limits on speed to be imposed under particular conditions. Since there can be multiple moving obstacles, multiple speed constraints can apply during the same time period and at the same location. A speed solver 632 uses optimization techniques to find a set of speed change decisions 634 that minimize the overall cost of violations of the speed constraints 616. Accordingly, each speed constraint 616 determines a cost to penalize constraint violations. The cost can be proportional to an amount by which the constraint is violated. A speed zone constraint 618, for example, determines a cost that penalizes speed limit violations for mobile robot locations that are within a polygon. A speed zone constraint 618 determines a cost that penalizes mobile robot speeds that exceed a speed limit 624 when the mobile robot is within an effective spatial range 620 (e.g., a polygon or a longitudinal distance) during an effective time range 622. A stopping constraint 626 is similar to a speed zone constraint 618, but determines a cost that penalizes travel violations if they occur beyond an effective spatial range 628 (e.g., a polygon or a longitudinal distance) during an effective time range 630. A stopping constraint 626 can correspond to a speed zone constraint 618 having a speed limit 624 of zero. Since the regional path 348 is given as an input, the locations along the regional path 348 at which speed constraints 616 are to be enforced can be specified as one-dimensional distances, e.g., as a start and an end distance. For dynamic objects, the times during which speed constraints 616 are to be enforced can be specified as ranges of elapsed travel time, e.g., as a start time and an end time.

As an example, an automatic door reasoner generates a stopping constraint 626 to impose costs on mobile robot travel beyond a door when the door is closed, and generates a speed zone constraint 618 to impose costs on mobile robot travel above a speed limit when the door is open. As another example, a stair reasoner generates a stopping constraint to impose costs on mobile robot travel beyond a stair to avoid falling down the stairs, and a speed zone constraint to impose costs on mobile robot travel above a speed limit within a threshold distance of the stairs. As still another example, a pedestrian reasoner generates a stopping constraint to impose costs on mobile robot travel within a particular threshold distance of pedestrians, and a speed zone constraint to impose costs on mobile robot travel within a farther threshold distance from pedestrians. Multiple obstacle reasoners 604 can operate concurrently. The speed solver 632 can resolve conflicts that arise between speed constraints 616.

The speed solver 632 generates a set of speed change decisions 634 that change the speed of the mobile robot over time in accordance with the speed constraints 616. The speed solver 632 uses optimization techniques to generate the speed change decisions 634. The set of speed change decisions 634 includes at least one speed change decision 636. A speed change decision 636 can be generated for each speed constraint 616, for example. Each speed change decision 636 includes a speed constraint 638 and an action 640. The speed constraint 638 can identify or reference the corresponding speed constraint 616 from which the speed change decision 636 has been generated. The action 640 can be a stop action, an accelerate action, a decelerate action, or a coast action, for example. The accelerate action causes the speed of the mobile robot to increase to a specified speed. The specified speed can be the speed limit associated with a speed zone constraint or other specified speed. The decelerate action causes the speed of the mobile robot to decrease to a specified speed. The coast action causes the robot to maintain the current speed for the duration of the planning horizon. The stop action causes the mobile robot to stop moving, e.g., decelerate to a speed of zero.

The speed solver 632 uses one or more optimization techniques to find a set of speed change decisions 634 that optimize (e.g., minimize) the overall cost of violations of the speed constraints 616. The speed solver 632 can search a path-time space to identify speed profiles that satisfy the constraints, for example. In some embodiments, the speed solver 632 divides the path-time space into discrete intervals and search for a solution in each interval. In other embodiments, the speed solver 632 performs a speed profile rollout, which involves sampling feasible speed controls of the mobile robot, such as acceleration and jerk, to generate motion primitives and explore the path-time space.

The speed directive generator 650 converts the speed change decisions 634 to speed directives 652 suitable for input to a local trajectory planner 670. The speed directives 652 can specify speed limits that apply during particular regions and times. Each speed directive 652 can be a speed zone directive 654, a stop directive 662, or other directive specifying constraints on speed. Each speed zone directive 654 includes a speed limit 660, a spatial range 656 specifying the location in discretized space 318 to which the speed limit 660 applies, and time range 658 during which the speed limit 660 applies. Each stop directive 662 includes a spatial range 664 in which the mobile robot is to stop, and a time range 666 during which the mobile robot is to stop.

The speed directive generator 650 generates the attributes of each speed directives 652, such as a spatial range 656, based on the corresponding attributes of the speed constraints 616 of the respective speed change decisions 634. The speed directive generator 650 generates a speed zone directive 654 for each speed change decision 636 for which the speed constraint 638 corresponds to a speed zone constraint 618. For example, to generate a speed zone directive 654 from a speed change decision 636, the spatial range 656, time range 658, and speed limit 660 of the speed zone directive 654 are set to the effective spatial range 620, the effective time range 622, and the speed limit 624, respectively, of the speed zone constraint 618 associated with the speed change decision 636. As another example, to generate a stop directive 662 from a speed change decision 636, the spatial range 664 and time range 666 of the stop directive 662 are set to the respective effective spatial range 628 and effective time range 630 of the stopping constraint 626 associated with the speed change decision 636.

The speed directives 652 are suitable for use as input to the local trajectory planner 670. The local trajectory planner 670 generates local trajectories 232 that satisfy the speed directives 652 and thus satisfy the speed constraints 616 in accordance with the speed change decisions 634 generated by the speed solver 632.

FIG. 7 illustrates a navigable space 700 that includes static and dynamic obstacles, and a path-time space representation 710 of the navigable space 700, according to various embodiments. A mobile robot 702 is located on a path 704 in the navigable space 700. A pedestrian 706 is moving towards the path 704 of the mobile robot 702. A closed automatic door 708 is blocking the path of the mobile robot 702. The path-time space 710 of the navigable space 700 illustrates the locations of the pedestrian 706 and closed automatic door 708 on a two-dimensional graph having a path distance axis 712 and a time axis 714. The path distance axis 712 represents distance along the path 704 and the time axis 714 represents elapsed time since the initial position of the mobile robot 702 shown in the navigable space 700. A pedestrian region 716 represents the location of the pedestrian 706 along the path 704 in time and space. The pedestrian 706 is located between path distances p0 and p1, and between times t0 and t1. The closed automatic door 708 is located between path distances p2 and p3, and between times 0 and t2. The motion of the mobile robot 702 along the path 704 over time is represented by speed profiles 720, 724. As shown by the speed profiles 720, the mobile robot 702 has an initial speed that would cause the speed profile 720 to intersect with the pedestrian region 716. Such an intersection between a speed profile and an obstacle region indicates that the mobile robot 702 collides with the obstacle. The speed decision maker 124 generates speed directives 652 that cause the mobile robot 702 to avoid colliding with the pedestrian 706 and automatic door 708.

For example, the problem formulator 602 includes a pedestrian obstacle reasoner 604 and a door obstacle reasoner 604. The pedestrian obstacle reasoner 604 identifies the pedestrian 706 and the obstacle location 608 of the pedestrian 706 in the distance map 224, and determines the obstacle motion description 610 of the pedestrian 706 based on of the motion (e.g., speed) of the pedestrian. The obstacle motion description 610 of the pedestrian 706 indicates that the pedestrian 706 is moving in a particular direction (e.g., to the west) at a particular speed (e.g., 3 km/hour). Accordingly, the pedestrian obstacle reasoner 604 generates a speed zone constraint 618 specifying a speed limit 624 for the mobile robot 702 (e.g., 5 km/hour) within an effective spatial range 620 (e.g., from p0 minus a safety margin through p1 plus a safety margin) and/or within an effective time range 622 (e.g., from t0 minus a safety margin through t1 plus a safety margin). The pedestrian obstacle reasoner 604 also generates a stopping constraint 626 specifying that the mobile robot 702 is to stop within an effective spatial range 620 (e.g., from p0 through p1) and/or within an effective time range 622 (e.g., from t0 through t1).

As another example, the door obstacle reasoner 604 identifies the automatic door 708 and the obstacle location 608 of the automatic door 708 in a navigable region 216 extracted from a semantic map 206. The door obstacle reasoner 604 also extracts semantic information describing the motion of the door from the navigable region 216 or semantic map 206, and determines the obstacle motion description 610 of the automatic door 708 based on the semantic information. The obstacle motion description 610 of the automatic door 708 indicates that the automatic door 708 is closed and blocks the path between times p2 and p3. Accordingly, the pedestrian obstacle reasoner 604 generates a stopping constraint 626 specifying that the mobile robot 702 is to stop within an effective spatial range 620 (e.g., from p2 through p3) and/pr an effective time range 622 (e.g., from 0 through t2).

The speed solver 632 searches the path-time space 710 to identify speed change decisions 634 that that avoid the pedestrian region 716 and the automatic door region 718. The example speed profiles 720, 724 correspond to speed change decisions 634 generated by the speed solver 632 and/or speed directives 652 generated by the speed directive generator 650 from the speed change decisions 634. In one example, as shown by the slower speed profile 720, to avoid collision with the pedestrian region 716 and automatic door region 718, the speed solver 632 can generate a speed change decision 634 specifying a decelerate action 722 to be performed at a time prior to t0 and/or at path distance prior to p0. By decelerating from the initial speed, the slower speed profile 720 causes the mobile robot 702 to arrive at the location on the path 704 crossed by the pedestrian 706 after the pedestrian 706 has crossed the path. In this way, the mobile robot 702 avoids a collision with the pedestrian 706.

In another example, as shown by the faster speed profile 724, to avoid collision, the speed solver 632 can generate a speed change decision 634 specifying an accelerate action 726 to be performed at a time prior to t0 and/or at a path distance prior to p0. By accelerating from the initial speed, the faster speed profile 724 causes the mobile robot 702 to arrive at the location on the path 704 crossed by the pedestrian 706 before the pedestrian 706 crosses the path, thereby avoiding a collision with the pedestrian 706. The speed resulting from the accelerate action 726 is sufficiently high that the mobile robot 702 will collide with the automatic door region 718 if the speed is not reduced. Thus, the speed solver 632 generates a decelerate action 730, which is performed at a time prior to t0 as shown in the path-time space 710. The decelerate action 730 slows the speed of the mobile robot 702 sufficiently so that the mobile robot 702 does not reach the automatic door 708 during the time the automatic door 708 is closed. In this way, the mobile robot 702 avoids a collision with the automatic door 708.

Now referring to FIG. 8, each block of method 800, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 800 is described, by way of example, with respect to the system of FIGS. 1-3 and 6. However, this method may additionally or alternatively be executed by any one system, or any combination of systems, including, but not limited to, those described herein. Further, the operations in method 800 can be omitted, repeated, and/or performed in any order without departing from the scope of the present disclosure.

FIG. 8 illustrates a flow diagram of a method for generating speed directives 228 for a path, according to various embodiments. As shown in FIG. 8, method 800 begins with operation 802, in which a speed decision maker 124 identifies, using one or more maps of a physical environment, one or more obstacles associated with one or more portions of a path of a mobile robot in the physical environment. For example, the maps can include a semantic map 206 received from a mapping system 204 and/or a distance map 224 received from a perception system 220. The semantic map 206 and/or the distance map 224 indicate the locations of obstacles in the physical environment and also can include semantic information about obstacles and/or about regions of the physical environment.

The speed decision maker 124 includes one or more obstacle reasoners 604. Each obstacle reasoner 604 is associated with one or more obstacle type(s) 606 for which the obstacle reasoner 604 handles processing tasks as described herein. Each obstacle reasoner 604 uses the distance map 224 and/or navigable regions 218 to identify one or more obstacles that are of the obstacle type(s) 606 handled by the respective obstacle reasoner 604 and are on or near a given regional path 348 in the physical environment. An obstacle is near the given regional path 348 if the obstacle is within a threshold distance of the regional path 348, for example.

In operation 804, the speed decision maker 124 generates, based at least on the one or more obstacles, one or more speed constraints, each speed constraint specifying a speed limit for a respective portion of the path. For example, when an obstacle reasoner 604 that handles obstacles of a particular obstacle type 606 identifies an obstacle of the particular obstacle type 606 in the navigable regions 218 or distance map 224, and the obstacle location 608 specified for the obstacle in the navigable regions 218 or distance map 224 is on or near the regional path 348, the obstacle reasoner 604 provides the obstacle location 608 of the obstacle and an obstacle motion description 610 of the obstacle (if present) to a constraint generator 614 that generates speed constraints 616 for obstacles of the particular obstacle type 606. The speed constraints 616 generated by the obstacle reasoners 604 can include a speed zone constraint 618, a stopping constraint 626, and/or other constraints that specify limits on speed to be imposed under particular conditions.

In operation 806, the speed decision maker 124 generates one or more speed change decisions that determine one or more speeds of the robot over time, the determined speeds of the robot over time satisfying the speed constraints. For example, the speed decision maker 124 includes a speed solver 632 that uses optimization techniques to find a set of speed change decisions 634 minimizing the overall cost of violations of the speed constraints 616. Each speed constraint 616 determines a cost to penalize constraint violations. The speed solver 632 generates a set of speed change decisions 634 that change the speed of the mobile robot over time in accordance with the speed constraints 616. For example, the speed change decisions 634 can be generated by the speed solver 632 such that the sum of the costs determined by the speed change decisions 634 for a speed profile corresponding to the speed change decisions 634 is optimized (e.g., minimized relative to other candidate sets of speed change decisions 634 identified by the speed solver 632).

In operation 808, the speed decision maker 124 converts the speed change decisions 634 to one or more speed directives 228 specifying speed limits for the mobile robot in specified distance ranges during specified time ranges. For example, the speed decision maker 124 can include a speed directive generator 650 that converts the speed change decisions 634 to corresponding speed directives 228.

In operation 810, the speed decision maker 124 causes the mobile robot to navigate in accordance with the speed directives 228. The speed directives 228 are suitable for input to a local trajectory planner 670, and the speed decision maker 124 provides the speed directives 228 to the local trajectory planner 230. The local trajectory planner 230 also receives a path, such as a regional path 226, and generates a local trajectory 232 using the speed directives 228 and the regional path 226. The local trajectory planner 230 provides the local trajectory 232 to a robot controller 234, which causes the robot to navigate in accordance with the speed directives 228 and the regional path 226.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing, and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems implementing one or more language models-such as large language models (LLMs) that process text, audio, and/or sensor data, systems for performing light transport simulation, systems for performing collaborative content creation for 3D assets, systems for performing generative AI operations, systems implemented at least partially using cloud computing resources, and/or other types of systems.

Example Autonomous Vehicle

FIG. 91A is an illustration of an example autonomous vehicle 9100, in accordance with some embodiments of the present disclosure. The autonomous vehicle 9100 (alternatively referred to herein as the "vehicle 9100") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 9100 may be capable of functionality in accordance with one or more of Level 3-Level 5 of the autonomous driving levels. The vehicle 9100 may be capable of functionality in accordance with one or more of Level 1-Level 5 of the autonomous driving levels. For example, the vehicle 9100 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 9100 or other machine, such as being fully autonomous, being highly autonomous, being conditionally autonomous, being partially autonomous, providing assistive autonomy, being semi-autonomous, being primarily autonomous, or other designation.

The vehicle 9100 may include components such as a chassis, a vehicle body, wheels (e.g., 2, 4, 6, 8, 18, etc.), tires, axles, and other components of a vehicle. The vehicle 9100 may include a propulsion system 9150, such as an internal combustion engine, hybrid electric power plant, an all-electric engine, and/or another propulsion system type. The propulsion system 9150 may be connected to a drive train of the vehicle 9100, which may include a transmission, to enable the propulsion of the vehicle 9100. The propulsion system 9150 may be controlled in response to receiving signals from the throttle/accelerator 9152.

A steering system 9154, which may include a steering wheel, may be used to steer the vehicle 9100 (e.g., along a desired path or route) when the propulsion system 9150 is operating (e.g., when the vehicle is in motion). The steering system 9154 may receive signals from a steering actuator 9156. The steering wheel may be optional for full automation (Level 5) functionality.

The brake sensor system 9146 may be used to operate the vehicle brakes in response to receiving signals from the brake actuators 9148 and/or brake sensors.

Controller(s) 9136, which may include one or more system on chips (SoCs) 9104 (FIG. 91C) and/or GPU(s), may provide signals (e.g., representative of commands) to one or more components and/or systems of the vehicle 9100. For example, the controller(s) may send signals to operate the vehicle brakes via one or more brake actuators 9148, to operate the steering system 9154 via one or more steering actuators 9156, to operate the propulsion system 9150 via one or more throttle/accelerators 9152. The controller(s) 9136 may include one or more onboard (e.g., integrated) computing devices (e.g., supercomputers) that process sensor signals, and output operation commands (e.g., signals representing commands) to enable autonomous driving and/or to assist a human driver in driving the vehicle 9100. The controller(s) 9136 may include a first controller 9136 for autonomous driving functions, a second controller 9136 for functional safety functions, a third controller 9136 for artificial intelligence functionality (e.g., computer vision), a fourth controller 9136 for infotainment functionality, a fifth controller 9136 for redundancy in emergency conditions, and/or other controllers. In some examples, a single controller 9136 may handle two or more of the above functionalities, two or more controllers 9136 may handle a single functionality, and/or any combination thereof.

The controller(s) 9136 may provide the signals for controlling one or more components and/or systems of the vehicle 9100 in response to sensor data received from one or more sensors (e.g., sensor inputs). The sensor data may be received from, for example and without limitation, global navigation satellite systems ("GNSS") sensor(s) 9158 (e.g., Global Positioning System sensor(s)), RADAR sensor(s) 9160, ultrasonic sensor(s) 9162, LIDAR sensor(s) 9164, inertial measurement unit (IMU) sensor(s) 9166 (e.g., accelerometer(s), gyroscope(s), magnetic compass(es), magnetometer(s), etc.), microphone(s) 9196, stereo camera(s) 9168, wide-view camera(s) 9170 (e.g., fisheye cameras), infrared camera(s) 9172, surround camera(s) 9174 (e.g., 360 degree cameras), long-range and/or mid-range camera(s) 9198, speed sensor(s) 9144 (e.g., for measuring the speed of the vehicle 9100), vibration sensor(s) 9142, steering sensor(s) 9140, brake sensor(s) (e.g., as part of the brake sensor system 9146), and/or other sensor types.

One or more of the controller(s) 9136 may receive inputs (e.g., represented by input data) from an instrument cluster 9132 of the vehicle 9100 and provide outputs (e.g., represented by output data, display data, etc.) via a human-machine interface (HMI) display 9134, an audible annunciator, a loudspeaker, and/or via other components of the vehicle 9100. The outputs may include information such as vehicle velocity, speed, time, map data (e.g., the High Definition ("HD") map 9122 of FIG. 91C), location data (e.g., the vehicle's 9100 location, such as on a map), direction, location of other vehicles (e.g., an occupancy grid), information about objects and status of objects as perceived by the controller(s) 9136, etc. For example, the HMI display 9134 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 9100 further includes a network interface 9124 which may use one or more wireless antenna(s) 9126 and/or modem(s) to communicate over one or more networks. For example, the network interface 9124 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 9126 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

FIG. 91B is an example of camera locations and fields of view for the example autonomous vehicle 9100 of FIG. 91A, in accordance with some embodiments of the present disclosure. The cameras and respective fields of view are one example embodiment and are not intended to be limiting. For example, additional and/or alternative cameras may be included and/or the cameras may be located at different locations on the vehicle 9100.

The camera types for the cameras may include, but are not limited to, digital cameras that may be adapted for use with the components and/or systems of the vehicle 9100. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 9100 (e.g., front-facing cameras) may be used for surround view, to help identify forward facing paths and obstacles, as well aid in, with the help of one or more controllers 9136 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 9170 that may be used to perceive objects coming into view from the periphery (e.g., pedestrians, crossing traffic or bicycles). Although only one wide-view camera is illustrated in FIG. 91B, there may be any number (including zero) of wide-view cameras 9170 on the vehicle 9100. In addition, any number of long-range camera(s) 9198 (e.g., a long-view stereo camera pair) may be used for depth-based object detection, especially for objects for which a neural network has not yet been trained. The long-range camera(s) 9198 may also be used for object detection and classification, as well as basic object tracking.

Any number of stereo cameras 9168 may also be included in a front-facing configuration. In at least one embodiment, one or more of stereo camera(s) 9168 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 9168 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 9168 may be used in addition to, or alternatively from, those described herein.

Cameras with a field of view that include portions of the environment to the side of the vehicle 9100 (e.g., side-view cameras) may be used for surround view, providing information used to create and update the occupancy grid, as well as to generate side impact collision warnings. For example, surround camera(s) 9174 (e.g., four surround cameras 9174 as illustrated in FIG. 91B) may be positioned to on the vehicle 9100. The surround camera(s) 9174 may include wide-view camera(s) 9170, fisheye camera(s), 360 degree camera(s), and/or the like. Four example, four fisheye cameras may be positioned on the vehicle's front, rear, and sides. In an alternative arrangement, the vehicle may use three surround camera(s) 9174 (e.g., left, right, and rear), and may leverage one or more other camera(s) (e.g., a forward-facing camera) as a fourth surround view camera.

Cameras with a field of view that include portions of the environment to the rear of the vehicle 9100 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 9198, stereo camera(s) 9168), infrared camera(s) 9172, etc.), as described herein.

FIG. 91C is a block diagram of an example system architecture for the example autonomous vehicle 9100 of FIG. 91A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 9100 in FIG. 91C are illustrated as being connected via bus 9102. The bus 9102 may include a Controller Area Network (CAN) data interface (alternatively referred to herein as a "CAN bus"). A CAN may be a network inside the vehicle 9100 used to aid in control of various features and functionality of the vehicle 9100, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 9102 is described herein as being a CAN bus, this is not intended to be limiting. For example, in addition to, or alternatively from, the CAN bus, FlexRay and/or Ethernet may be used. Additionally, although a single line is used to represent the bus 9102, this is not intended to be limiting. For example, there may be any number of busses 9102, which may include one or more CAN busses, one or more FlexRay busses, one or more Ethernet busses, and/or one or more other types of busses using a different protocol. In some examples, two or more busses 9102 may be used to perform different functions, and/or may be used for redundancy. For example, a first bus 9102 may be used for collision avoidance functionality and a second bus 9102 may be used for actuation control. In any example, each bus 9102 may communicate with any of the components of the vehicle 9100, and two or more busses 9102 may communicate with the same components. In some examples, each SoC 9104, each controller 9136, and/or each computer within the vehicle may have access to the same input data (e.g., inputs from sensors of the vehicle 9100), and may be connected to a common bus, such the CAN bus.

The vehicle 9100 may include one or more controller(s) 9136, such as those described herein with respect to FIG. 91A. The controller(s) 9136 may be used for a variety of functions. The controller(s) 9136 may be coupled to any of the various other components and systems of the vehicle 9100, and may be used for control of the vehicle 9100, artificial intelligence of the vehicle 9100, infotainment for the vehicle 9100, and/or the like.

The vehicle 9100 may include a system(s) on a chip (SoC) 9104. The SoC 9104 may include CPU(s) 9106, GPU(s) 9108, processor(s) 9110, cache(s) 9112, accelerator(s) 9114, data store(s) 9116, and/or other components and features not illustrated. The SoC(s) 9104 may be used to control the vehicle 9100 in a variety of platforms and systems. For example, the SoC(s) 9104 may be combined in a system (e.g., the system of the vehicle 9100) with an HD map 9122 which may obtain map refreshes and/or updates via a network interface 9124 from one or more servers (e.g., server(s) 9178 of FIG. 91D).

The CPU(s) 9106 may include a CPU cluster or CPU complex (alternatively referred to herein as a "CCPLEX"). The CPU(s) 9106 may include multiple cores and/or L2 caches. For example, in some embodiments, the CPU(s) 9106 may include eight cores in a coherent multi-processor configuration. In some embodiments, the CPU(s) 9106 may include four dual-core clusters where each cluster has a dedicated L2 cache (e.g., a 2 MB L2 cache). The CPU(s) 9106 (e.g., the CCPLEX) may be configured to support simultaneous cluster operation enabling any combination of the clusters of the CPU(s) 9106 to be active at any given time.

The CPU(s) 9106 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 9106 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 9108 may include an integrated GPU (alternatively referred to herein as an "iGPU"). The GPU(s) 9108 may be programmable and may be efficient for parallel workloads. The GPU(s) 9108, in some examples, may use an enhanced tensor instruction set. The GPU(s) 9108 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 9108 may include at least eight streaming microprocessors. The GPU(s) 9108 may use compute application programming interface(s) (API(s)). In addition, the GPU(s) 9108 may use one or more parallel computing platforms and/or programming models (e.g., NVIDIA's CUDA).

The GPU(s) 9108 may be power-optimized for best performance in automotive and embedded use cases. For example, the GPU(s) 9108 may be fabricated on a Fin field-effect transistor (FinFET). However, this is not intended to be limiting and the GPU(s) 9108 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 9108 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 9108 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 9108 to access the CPU(s) 9106 page tables directly. In such examples, when the GPU(s) 9108 memory management unit (MMU) experiences a miss, an address translation request may be transmitted to the CPU(s) 9106. In response, the CPU(s) 9106 may look in its page tables for the virtual-to-physical mapping for the address and transmits the translation back to the GPU(s) 9108. As such, unified memory technology may allow a single unified virtual address space for memory of both the CPU(s) 9106 and the GPU(s) 9108, thereby simplifying the GPU(s) 9108 programming and porting of applications to the GPU(s) 9108.

In addition, the GPU(s) 9108 may include an access counter that may keep track of the frequency of access of the GPU(s) 9108 to memory of other processors. The access counter may help ensure that memory pages are moved to the physical memory of the processor that is accessing the pages most frequently.

The SoC(s) 9104 may include any number of cache(s) 9112, including those described herein. For example, the cache(s) 9112 may include an L3 cache that is available to both the CPU(s) 9106 and the GPU(s) 9108 (e.g., that is connected both the CPU(s) 9106 and the GPU(s) 9108). The cache(s) 9112 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 9104 may include an arithmetic logic unit(s) (ALU(s)) which may be leveraged in performing processing with respect to any of the variety of tasks or operations of the vehicle 9100—such as processing DNNs. In addition, the SoC(s) 9104 may include a floating point unit(s) (FPU(s))—or other math coprocessor or numeric coprocessor types—for performing mathematical operations within the system.

For example, the SoC(s) 104 may include one or more FPUs integrated as execution units within a CPU(s) 9106 and/or GPU(s) 9108.

The SoC(s) 9104 may include one or more accelerators 9114 (e.g., hardware accelerators, software accelerators, or a combination thereof). For example, the SoC(s) 9104 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 9108 and to off-load some of the tasks of the GPU(s) 9108 (e.g., to free up more cycles of the GPU(s) 9108 for performing other tasks). As an example, the accelerator(s) 9114 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 9114 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 9108, and by using an inference accelerator, for example, a designer may target either the DLA(s) or the GPU(s) 9108 for any function. For example, the designer may focus processing of CNNs and floating point operations on the DLA(s) and leave other functions to the GPU(s) 9108 and/or other accelerator(s) 9114.

The accelerator(s) 9114 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 9106. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 9114 (e.g., the hardware acceleration cluster) may include a computer vision network on-chip and SRAM, for providing a high-bandwidth, low latency SRAM for the accelerator(s) 9114. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 9104 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 9114 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 9166 output that correlates with the vehicle 9100 orientation, distance, 3D location estimates of the object obtained from the neural network and/or other sensors (e.g., LIDAR sensor(s) 9164 or RADAR sensor(s) 9160), among others.

The SoC(s) 9104 may include data store(s) 9116 (e.g., memory). The data store(s) 9116 may be on-chip memory of the SoC(s) 9104, which may store neural networks to be executed on the GPU and/or the DLA. In some examples, the data store(s) 9116 may be large enough in capacity to store multiple instances of neural networks for redundancy and safety. The data store(s) 9112 may comprise L2 or L3 cache(s) 9112. Reference to the data store(s) 9116 may include reference to the memory associated with the PVA, DLA, and/or other accelerator(s) 9114, as described herein.

The SoC(s) 9104 may include one or more processor(s) 9110 (e.g., embedded processors). The processor(s) 9110 may include a boot and power management processor that may be a dedicated processor and subsystem to handle boot power and management functions and related security enforcement. The boot and power management processor may be a part of the SoC(s) 9104 boot sequence and may provide runtime power management services. The boot power and management processor may provide clock and voltage programming, assistance in system low power state transitions, management of SoC(s) 9104 thermals and temperature sensors, and/or management of the SoC(s) 9104 power states. Each temperature sensor may be implemented as a ring-oscillator whose output frequency is proportional to temperature, and the SoC(s) 9104 may use the ring-oscillators to detect temperatures of the CPU(s) 9106, GPU(s) 9108, and/or accelerator(s) 9114. If temperatures are determined to exceed a threshold, the boot and power management processor may enter a temperature fault routine and put the SoC(s) 9104 into a lower power state and/or put the vehicle 9100 into a chauffeur to safe stop mode (e.g., bring the vehicle 9100 to a safe stop).

The processor(s) 9110 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 9110 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 9110 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 9110 may further include a real-time camera engine that may include a dedicated processor subsystem for handling real-time camera management.

The processor(s) 9110 may further include a high-dynamic range signal processor that may include an image signal processor that is a hardware engine that is part of the camera processing pipeline.

The processor(s) 9110 may include a video image compositor that may be a processing block (e.g., implemented on a microprocessor) that implements video post-processing functions needed by a video playback application to produce the final image for the player window. The video image compositor may perform lens distortion correction on wide-view camera(s) 9170, surround camera(s) 9174, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 9108 is not required to continuously render new surfaces. Even when the GPU(s) 9108 is powered on and active doing 3D rendering, the video image compositor may be used to offload the GPU(s) 9108 to improve performance and responsiveness.

The SoC(s) 9104 may further include a mobile industry processor interface (MIPI) camera serial interface for receiving video and input from cameras, a high-speed interface, and/or a video input block that may be used for camera and related pixel input functions. The SoC(s) 9104 may further include an input/output controller(s) that may be controlled by software and may be used for receiving I/O signals that are uncommitted to a specific role.

The SoC(s) 9104 may further include a broad range of peripheral interfaces to enable communication with peripherals, audio codecs, power management, and/or other devices. The SoC(s) 9104 may be used to process data from cameras (e.g., connected over Gigabit Multimedia Serial Link and Ethernet), sensors (e.g., LIDAR sensor(s) 9164, RADAR sensor(s) 9160, etc. that may be connected over Ethernet), data from bus 9102 (e.g., speed of vehicle 9100, steering wheel position, etc.), data from GNSS sensor(s) 9158 (e.g., connected over Ethernet or CAN bus). The SoC(s) 9104 may further include dedicated high-performance mass storage controllers that may include their own DMA engines, and that may be used to free the CPU(s) 9106 from routine data management tasks.

The SoC(s) 9104 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 9104 may be faster, more reliable, and even more energy-efficient and space-efficient than conventional systems. For example, the accelerator(s) 9114, when combined with the CPU(s) 9106, the GPU(s) 9108, and the data store(s) 9116, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 9120) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 9108.

In some examples, a CNN for facial recognition and vehicle owner identification may use data from camera sensors to identify the presence of an authorized driver and/or owner of the vehicle 9100. The always on sensor processing engine may be used to unlock the vehicle when the owner approaches the driver door and turn on the lights, and, in security mode, to disable the vehicle when the owner leaves the vehicle. In this way, the SoC(s) 9104 provide for security against theft and/or carjacking.

In another example, a CNN for emergency vehicle detection and identification may use data from microphones 9196 to detect and identify emergency vehicle sirens. In contrast to conventional systems, that use general classifiers to detect sirens and manually extract features, the SoC(s) 9104 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 9158. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 9162, until the emergency vehicle(s) passes.

The vehicle may include a CPU(s) 9118 (e.g., discrete CPU(s), or dCPU(s)), that may be coupled to the SoC(s) 9104 via a high-speed interconnect (e.g., PCIe). The CPU(s) 9118 may include an X86 processor, for example. The CPU(s) 9118 may be used to perform any of a variety of functions, including arbitrating potentially inconsistent results between ADAS sensors and the SoC(s) 9104, and/or monitoring the status and health of the controller(s) 9136 and/or infotainment SoC 9130, for example.

The vehicle 9100 may include a GPU(s) 9120 (e.g., discrete GPU(s), or dGPU(s)), that may be coupled to the SoC(s) 9104 via a high-speed interconnect (e.g., NVIDIA's NVLINK). The GPU(s) 9120 may provide additional artificial intelligence functionality, such as by executing redundant and/or different neural networks, and may be used to train and/or update neural networks based on input (e.g., sensor data) from sensors of the vehicle 9100.

The vehicle 9100 may further include the network interface 9124 which may include one or more wireless antennas 9126 (e.g., one or more wireless antennas for different communication protocols, such as a cellular antenna, a Bluetooth antenna, etc.). The network interface 9124 may be used to enable wireless connectivity over the Internet with the cloud (e.g., with the server(s) 9178 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 9100 information about vehicles in proximity to the vehicle 9100 (e.g., vehicles in front of, on the side of, and/or behind the vehicle 9100). This functionality may be part of a cooperative adaptive cruise control functionality of the vehicle 9100.

The network interface 9124 may include a SoC that provides modulation and demodulation functionality and enables the controller(s) 9136 to communicate over wireless networks. The network interface 9124 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 9100 may further include data store(s) 9128 which may include off-chip (e.g., off the SoC(s) 9104) storage. The data store(s) 9128 may include one or more storage elements including RAM, SRAM, DRAM, VRAM, Flash, hard disks, and/or other components and/or devices that may store at least one bit of data.

The vehicle 9100 may further include GNSS sensor(s) 9158. The GNSS sensor(s) 9158 (e.g., GPS, assisted GPS sensors, differential GPS (DGPS) sensors, etc.), to assist in mapping, perception, occupancy grid generation, and/or path planning functions. Any number of GNSS sensor(s) 9158 may be used, including, for example and without limitation, a GPS using a USB connector with an Ethernet to Serial (RS-232) bridge.

The vehicle 9100 may further include RADAR sensor(s) 9160. The RADAR sensor(s) 9160 may be used by the vehicle 9100 for long-range vehicle detection, even in darkness and/or severe weather conditions. RADAR functional safety levels may be ASIL B. The RADAR sensor(s) 9160 may use the CAN and/or the bus 9102 (e.g., to transmit data generated by the RADAR sensor(s) 9160) for control and to access object tracking data, with access to Ethernet to access raw data in some examples. A wide variety of RADAR sensor types may be used. For example, and without limitation, the RADAR sensor(s) 9160 may be suitable for front, rear, and side RADAR use. In some example, Pulse Doppler RADAR sensor(s) are used.

The RADAR sensor(s) 9160 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 9160 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 9100 surroundings at higher speeds with minimal interference from traffic in adjacent lanes. The other two antennae may expand the field of view, making it possible to quickly detect vehicles entering or leaving the vehicle's 9100 lane.

Mid-range RADAR systems may include, as an example, a range of up to 9160 m (front) or 80 m (rear), and a field of view of up to 42 degrees (front) or 9150 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 9100 may further include ultrasonic sensor(s) 9162. The ultrasonic sensor(s) 9162, which may be positioned at the front, back, and/or the sides of the vehicle 9100, may be used for park assist and/or to create and update an occupancy grid. A wide variety of ultrasonic sensor(s) 9162 may be used, and different ultrasonic sensor(s) 9162 may be used for different ranges of detection (e.g., 2.5 m, 4 m). The ultrasonic sensor(s) 9162 may operate at functional safety levels of ASIL B.

The vehicle 9100 may include LIDAR sensor(s) 9164. The LIDAR sensor(s) 9164 may be used for object and pedestrian detection, emergency braking, collision avoidance, and/or other functions. The LIDAR sensor(s) 9164 may be functional safety level ASIL B. In some examples, the vehicle 9100 may include multiple LIDAR sensors 9164 (e.g., two, four, six, etc.) that may use Ethernet (e.g., to provide data to a Gigabit Ethernet switch).

In some examples, the LIDAR sensor(s) 9164 may be capable of providing a list of objects and their distances for a 360-degree field of view. Commercially available LIDAR sensor(s) 9164 may have an advertised range of approximately 9100 m, with an accuracy of 2 cm-3 cm, and with support for a 9100 Mbps Ethernet connection, for example. In some examples, one or more non-protruding LIDAR sensors 9164 may be used. In such examples, the LIDAR sensor(s) 9164 may be implemented as a small device that may be embedded into the front, rear, sides, and/or corners of the vehicle 9100. The LIDAR sensor(s) 9164, in such examples, may provide up to a 120-degree horizontal and 35-degree vertical field-of-view, with a 200 m range even for low-reflectivity objects. Front-mounted LIDAR sensor(s) 9164 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 9100. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 9164 may be less susceptible to motion blur, vibration, and/or shock.

The vehicle may further include IMU sensor(s) 9166. The IMU sensor(s) 9166 may be located at a center of the rear axle of the vehicle 9100, in some examples. The IMU sensor(s) 9166 may include, for example and without limitation, an accelerometer(s), a magnetometer(s), a gyroscope(s), a magnetic compass(es), and/or other sensor types. In some examples, such as in six-axis applications, the IMU sensor(s) 9166 may include accelerometers and gyroscopes, while in nine-axis applications, the IMU sensor(s) 9166 may include accelerometers, gyroscopes, and magnetometers.

In some embodiments, the IMU sensor(s) 9166 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 9166 may enable the vehicle 9100 to estimate heading without requiring input from a magnetic sensor by directly observing and correlating the changes in velocity from GPS to the IMU sensor(s) 9166. In some examples, the IMU sensor(s) 9166 and the GNSS sensor(s) 9158 may be combined in a single integrated unit.

The vehicle may include microphone(s) 9196 placed in and/or around the vehicle 9100. The microphone(s) 9196 may be used for emergency vehicle detection and identification, among other things.

The vehicle may further include any number of camera types, including stereo camera(s) 9168, wide-view camera(s) 9170, infrared camera(s) 9172, surround camera(s) 9174, long-range and/or mid-range camera(s) 9198, and/or other camera types. The cameras may be used to capture image data around an entire periphery of the vehicle 9100. The types of cameras used depends on the embodiments and requirements for the vehicle 9100, and any combination of camera types may be used to provide the necessary coverage around the vehicle 9100. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 91A and FIG. 91B.

The vehicle 9100 may further include vibration sensor(s) 9142. The vibration sensor(s) 9142 may measure vibrations of components of the vehicle, such as the axle(s). For example, changes in vibrations may indicate a change in road surfaces. In another example, when two or more vibration sensors 9142 are used, the differences between the vibrations may be used to determine friction or slippage of the road surface (e.g., when the difference in vibration is between a power-driven axle and a freely rotating axle).

The vehicle 9100 may include an ADAS system 9138. The ADAS system 9138 may include a SoC, in some examples. The ADAS system 9138 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 9160, LIDAR sensor(s) 9164, and/or a camera(s). The ACC systems may include longitudinal ACC and/or lateral ACC. Longitudinal ACC monitors and controls the distance to the vehicle immediately ahead of the vehicle 9100 and automatically adjust the vehicle speed to maintain a safe distance from vehicles ahead. Lateral ACC performs distance keeping, and advises the vehicle 9100 to change lanes when necessary. Lateral ACC is related to other ADAS applications such as LCA and CWS.

CACC uses information from other vehicles that may be received via the network interface 9124 and/or the wireless antenna(s) 9126 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 9100), while the I2V communication concept provides information about traffic further ahead. CACC systems may include either or both I2V and V2V information sources. Given the information of the vehicles ahead of the vehicle 9100, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 9160, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 9160, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 9100 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 9100 if the vehicle 9100 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 9160, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 9100 is backing up. Some RCTW systems include AEB to ensure that the vehicle brakes are applied to avoid a crash. RCTW systems may use one or more rear-facing RADAR sensor(s) 9160, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 9100, the vehicle 9100 itself must, in the case of conflicting results, decide whether to heed the result from a primary computer or a secondary computer (e.g., a first controller 9136 or a second controller 9136). For example, in some embodiments, the ADAS system 9138 may be a backup and/or secondary computer for providing perception information to a backup computer rationality module. The backup computer rationality monitor may run a redundant diverse software on hardware components to detect faults in perception and dynamic driving tasks. Outputs from the ADAS system 9138 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 9104.

In other examples, ADAS system 9138 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 9138 may be fed into the primary computer's perception block and/or the primary computer's dynamic driving task block. For example, if the ADAS system 9138 indicates a forward crash warning due to an object immediately ahead, the perception block may use this information when identifying objects. In other examples, the secondary computer may have its own neural network which is trained and thus reduces the risk of false positives, as described herein.

The vehicle 9100 may further include the infotainment SoC 9130 (e.g., an in-vehicle infotainment system (IVI)). Although illustrated and described as a SoC, the infotainment system may not be a SoC, and may include two or more discrete components. The infotainment SoC 9130 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 9100. For example, the infotainment SoC 9130 may radios, disk players, navigation systems, video players, USB and Bluetooth connectivity, carputers, in-car entertainment, Wi-Fi, steering wheel audio controls, hands free voice control, a heads-up display (HUD), an HMI display 9134, a telematics device, a control panel (e.g., for controlling and/or interacting with various components, features, and/or systems), and/or other components. The infotainment SoC 9130 may further be used to provide information (e.g., visual and/or audible) to a user(s) of the vehicle, such as information from the ADAS system 9138, autonomous driving information such as planned vehicle maneuvers, trajectories, surrounding environment information (e.g., intersection information, vehicle information, road information, etc.), and/or other information.

The infotainment SoC 9130 may include GPU functionality. The infotainment SoC 9130 may communicate over the bus 9102 (e.g., CAN bus, Ethernet, etc.) with other devices, systems, and/or components of the vehicle 9100. In some examples, the infotainment SoC 9130 may be coupled to a supervisory MCU such that the GPU of the infotainment system may perform some self-driving functions in the event that the primary controller(s) 9136 (e.g., the primary and/or backup computers of the vehicle 9100) fail. In such an example, the infotainment SoC 9130 may put the vehicle 9100 into a chauffeur to safe stop mode, as described herein.

The vehicle 9100 may further include an instrument cluster 9132 (e.g., a digital dash, an electronic instrument cluster, a digital instrument panel, etc.). The instrument cluster 9132 may include a controller and/or supercomputer (e.g., a discrete controller or supercomputer). The instrument cluster 9132 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 9130 and the instrument cluster 9132. In other words, the instrument cluster 9132 may be included as part of the infotainment SoC 9130, or vice versa.

FIG. 91D is a system diagram for communication between cloud-based server(s) and the example autonomous vehicle 9100 of FIG. 91A, in accordance with some embodiments of the present disclosure. The system 9176 may include server(s) 9178, network(s) 9190, and vehicles, including the vehicle 9100. The server(s) 9178 may include a plurality of GPUs 9184(A)-9184(H) (collectively referred to herein as GPUs 9184), PCIe switches 9182(A)-9182 (H) (collectively referred to herein as PCIe switches 9182), and/or CPUs 9180(A)-9180(B) (collectively referred to herein as CPUs 9180). The GPUs 9184, the CPUs 9180, and the PCIe switches may be interconnected with high-speed interconnects such as, for example and without limitation, NVLink interfaces 9188 developed by NVIDIA and/or PCIe connections 9186. In some examples, the GPUs 9184 are connected via NVLink and/or NVSwitch SoC and the GPUs 9184 and the PCIe switches 9182 are connected via PCIe interconnects. Although eight GPUs 9184, two CPUs 9180, and two PCIe switches are illustrated, this is not intended to be limiting. Depending on the embodiment, each of the server(s) 9178 may include any number of GPUs 9184, CPUs 9180, and/or PCIe switches. For example, the server(s) 9178 may each include eight, sixteen, thirty-two, and/or more GPUs 9184.

The server(s) 9178 may receive, over the network(s) 9190 and from the vehicles, image data representative of images showing unexpected or changed road conditions, such as recently commenced road-work. The server(s) 9178 may transmit, over the network(s) 9190 and to the vehicles, neural networks 9192, updated neural networks 9192, and/or map information 9194, including information regarding traffic and road conditions. The updates to the map information 9194 may include updates for the HD map 9122, such as information regarding construction sites, potholes, detours, flooding, and/or other obstructions. In some examples, the neural networks 9192, the updated neural networks 9192, and/or the map information 9194 may have resulted from new training and/or experiences represented in data received from any number of vehicles in the environment, and/or based on training performed at a datacenter (e.g., using the server(s) 9178 and/or other servers).

The server(s) 9178 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 9190, and/or the machine learning models may be used by the server(s) 9178 to remotely monitor the vehicles.

In some examples, the server(s) 9178 may receive data from the vehicles and apply the data to up-to-date real-time neural networks for real-time intelligent inferencing. The server(s) 9178 may include deep-learning supercomputers and/or dedicated AI computers powered by GPU(s) 9184, such as a DGX and DGX Station machines developed by NVIDIA. However, in some examples, the server(s) 9178 may include deep learning infrastructure that use only CPU-powered datacenters.

The deep-learning infrastructure of the server(s) 9178 may be capable of fast, real-time inferencing, and may use that capability to evaluate and verify the health of the processors, software, and/or associated hardware in the vehicle 9100. For example, the deep-learning infrastructure may receive periodic updates from the vehicle 9100, such as a sequence of images and/or objects that the vehicle 9100 has located in that sequence of images (e.g., via computer vision and/or other machine learning object classification techniques). The deep-learning infrastructure may run its own neural network to identify the objects and compare them with the objects identified by the vehicle 9100 and, if the results do not match and the infrastructure concludes that the AI in the vehicle 9100 is malfunctioning, the server(s) 9178 may transmit a signal to the vehicle 9100 instructing a fail-safe computer of the vehicle 9100 to assume control, notify the passengers, and complete a safe parking maneuver.

For inferencing, the server(s) 9178 may include the GPU(s) 9184 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAS, and other processors may be used for inferencing.

Example Computing Device

Figure 10:
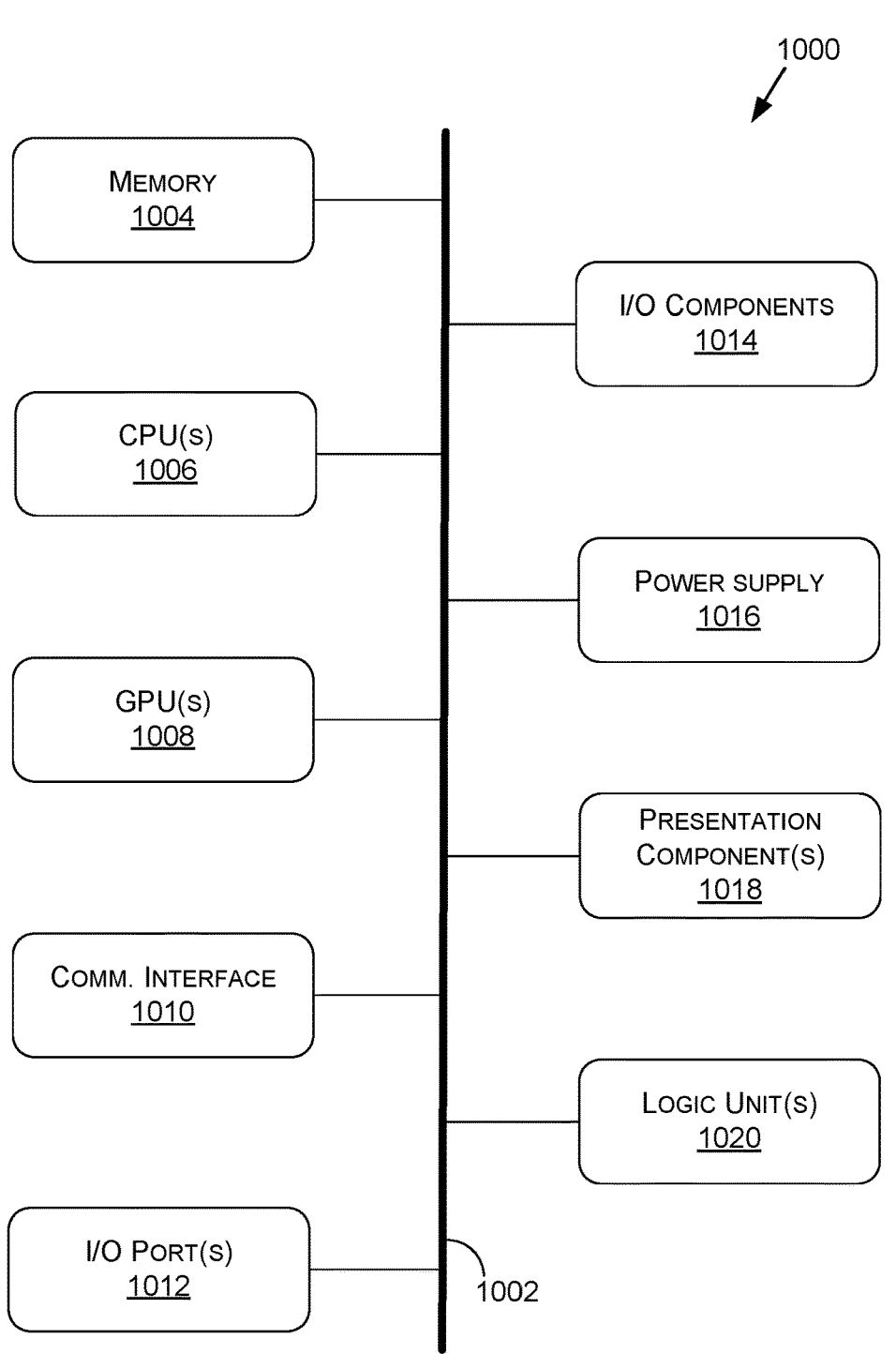
FIG. 10 is a block diagram of an example computing device suitable for use in implementing some embodiments of the present disclosure.

FIG. 10 is a block diagram of an example computing device(s) 1000 suitable for use in implementing some embodiments of the present disclosure. Computing device 1000 may include an interconnect system 1002 that directly or indirectly couples the following devices: memory 1004, one or more central processing units (CPUs) 1006, one or more graphics processing units (GPUs) 1008, a communication interface 1010, input/output (I/O) ports 1012, input/output components 1014, a power supply 1016, one or more presentation components 1018 (e.g., display(s)), and one or more logic units 1020. In at least one embodiment, the computing device(s) 1000 may comprise one or more virtual machines (VMs), and/or any of the components thereof may comprise virtual components (e.g., virtual hardware components). For non-limiting examples, one or more of the GPUs 1008 may comprise one or more vGPUs, one or more of the CPUs 1006 may comprise one or more vCPUs, and/or one or more of the logic units 1020 may comprise one or more virtual logic units. As such, a computing device(s) 1000 may include discrete components (e.g., a full GPU dedicated to the computing device 1000), virtual components (e.g., a portion of a GPU dedicated to the computing device 1000), or a combination thereof.

Although the various blocks of FIG. 10 are shown as connected via the interconnect system 1002 with lines, this is not intended to be limiting and is for clarity only. For example, in some embodiments, a presentation component 1018, such as a display device, may be considered an I/O component 1014 (e.g., if the display is a touch screen). As another example, the CPUs 1006 and/or GPUs 1008 may include memory (e.g., the memory 1004 may be representative of a storage device in addition to the memory of the GPUs 1008, the CPUs 1006, and/or other components). In other words, the computing device of FIG. 10 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 10.

The interconnect system 1002 may represent one or more links or busses, such as an address bus, a data bus, a control bus, or a combination thereof. The interconnect system 1002 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1006 may be directly connected to the memory 1004. Further, the CPU 1006 may be directly connected to the GPU 1008. Where there is direct, or point-to-point connection between components, the interconnect system 1002 may include a PCIe link to carry out the connection. In these examples, a PCI bus need not be included in the computing device 1000.

The memory 1004 may include any of a variety of computer-readable media. The computer-readable media may be any available media that may be accessed by the computing device 1000. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1004 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1000. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1006 may be configured to execute at least some of the computer-readable instructions to control one or more components of the computing device 1000 to perform one or more of the methods and/or processes described herein. The CPU(s) 1006 may each include one or more cores (e.g., one, two, four, eight, twenty-eight, seventy-two, etc.) that are capable of handling a multitude of software threads simultaneously. The CPU(s) 1006 may include any type of processor, and may include different types of processors depending on the type of computing device 1000 implemented (e.g., processors with fewer cores for mobile devices and processors with more cores for servers). For example, depending on the type of computing device 1000, the processor may be an Advanced RISC Machines (ARM) processor implemented using Reduced Instruction Set Computing (RISC) or an x86 processor implemented using Complex Instruction Set Computing (CISC). The computing device 1000 may include one or more CPUs 1006 in addition to one or more microprocessors or supplementary co-processors, such as math co-processors.

In addition to or alternatively from the CPU(s) 1006, the GPU(s) 1008 may be configured to execute at least some of the computer-readable instructions to control one or more components of the computing device 1000 to perform one or more of the methods and/or processes described herein. One or more of the GPU(s) 1008 may be an integrated GPU (e.g., with one or more of the CPU(s) 1006 and/or one or more of the GPU(s) 1008 may be a discrete GPU. In embodiments, one or more of the GPU(s) 1008 may be a coprocessor of one or more of the CPU(s) 1006. The GPU(s) 1008 may be used by the computing device 1000 to render graphics (e.g., 3D graphics) or perform general purpose computations. For example, the GPU(s) 1008 may be used for General-Purpose computing on GPUs (GPGPU). The GPU(s) 1008 may include hundreds or thousands of cores that are capable of handling hundreds or thousands of software threads simultaneously. The GPU(s) 1008 may generate pixel data for output images in response to rendering commands (e.g., rendering commands from the CPU(s) 1006 received via a host interface). The GPU(s) 1008 may include graphics memory, such as display memory, for storing pixel data or any other suitable data, such as GPGPU data. The display memory may be included as part of the memory 1004. The GPU(s) 1008 may include two or more GPUs operating in parallel (e.g., via a link). The link may directly connect the GPUs (e.g., using NVLINK) or may connect the GPUs through a switch (e.g., using NVSwitch). When combined together, each GPU 1008 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1006 and/or the GPU(s) 1008, the logic unit(s) 1020 may be configured to execute at least some of the computer-readable instructions to control one or more components of the computing device 1000 to perform one or more of the methods and/or processes described herein. In embodiments, the CPU(s) 1006, the GPU(s) 1008, and/or the logic unit(s) 1020 may discretely or jointly perform any combination of the methods, processes and/or portions thereof. One or more of the logic units 1020 may be part of and/or integrated in one or more of the CPU(s) 1006 and/or the GPU(s) 1008 and/or one or more of the logic units 1020 may be discrete components or otherwise external to the CPU(s) 1006 and/or the GPU(s) 1008. In embodiments, one or more of the logic units 1020 may be a coprocessor of one or more of the CPU(s) 1006 and/or one or more of the GPU(s) 1008.

Examples of the logic unit(s) 1020 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

In various embodiments, one or more CPU(s) 1006, GPU(s) 1008, and/or logic unit(s) 1020 are configured to execute one or more instances of regional path planner 122 and/or speed decision maker 124. Sorted measurements 292 generated by regional path planner 122 may then be used by speed decision maker 124 and/or additional components to perform additional processing such as planning and control functions.

The communication interface 1010 may include one or more receivers, transmitters, and/or transceivers that enable the computing device 1000 to communicate with other computing devices via an electronic communication network, included wired and/or wireless communications. The communication interface 1010 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1020 and/or communication interface 1010 may include one or more data processing units (DPUs) to transmit data received over a network and/or through interconnect system 1002 directly to (e.g., a memory of) one or more GPU(s) 1008.

The I/O ports 1012 may enable the computing device 1000 to be logically coupled to other devices including the I/O components 1014, the presentation component(s) 1018, and/or other components, some of which may be built in to (e.g., integrated in) the computing device 1000. Illustrative I/O components 1014 include a microphone, mouse, keyboard, joystick, game pad, game controller, satellite dish, scanner, printer, wireless device, etc. The I/O components 1014 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may be include depth cameras, such as stereoscopic camera systems, infrared camera systems, RGB camera systems, touchscreen technology, and combinations of these, for gesture detection and recognition. Additionally, the computing device 1000 may include accelerometers or gyroscopes (e.g., as part of an inertia measurement unit (IMU)) that enable detection of motion. In some examples, the output of the accelerometers or gyroscopes may be used by the computing device 1000 to render immersive augmented reality or virtual reality.

The power supply 1016 may include a hard-wired power supply, a battery power supply, or a combination thereof. The power supply 1016 may provide power to the computing device 1000 to enable the components of the computing device 1000 to operate.

The presentation component(s) 1018 may include a display (e.g., a monitor, a touch screen, a television screen, a heads-up-display (HUD), other display types, or a combination thereof), speakers, and/or other presentation components. The presentation component(s) 1018 may receive data from other components (e.g., the GPU(s) 1008, the CPU(s) 1006, DPUs, etc.), and output the data (e.g., as an image, video, sound, etc.).

Example Data Center

Figure 11:
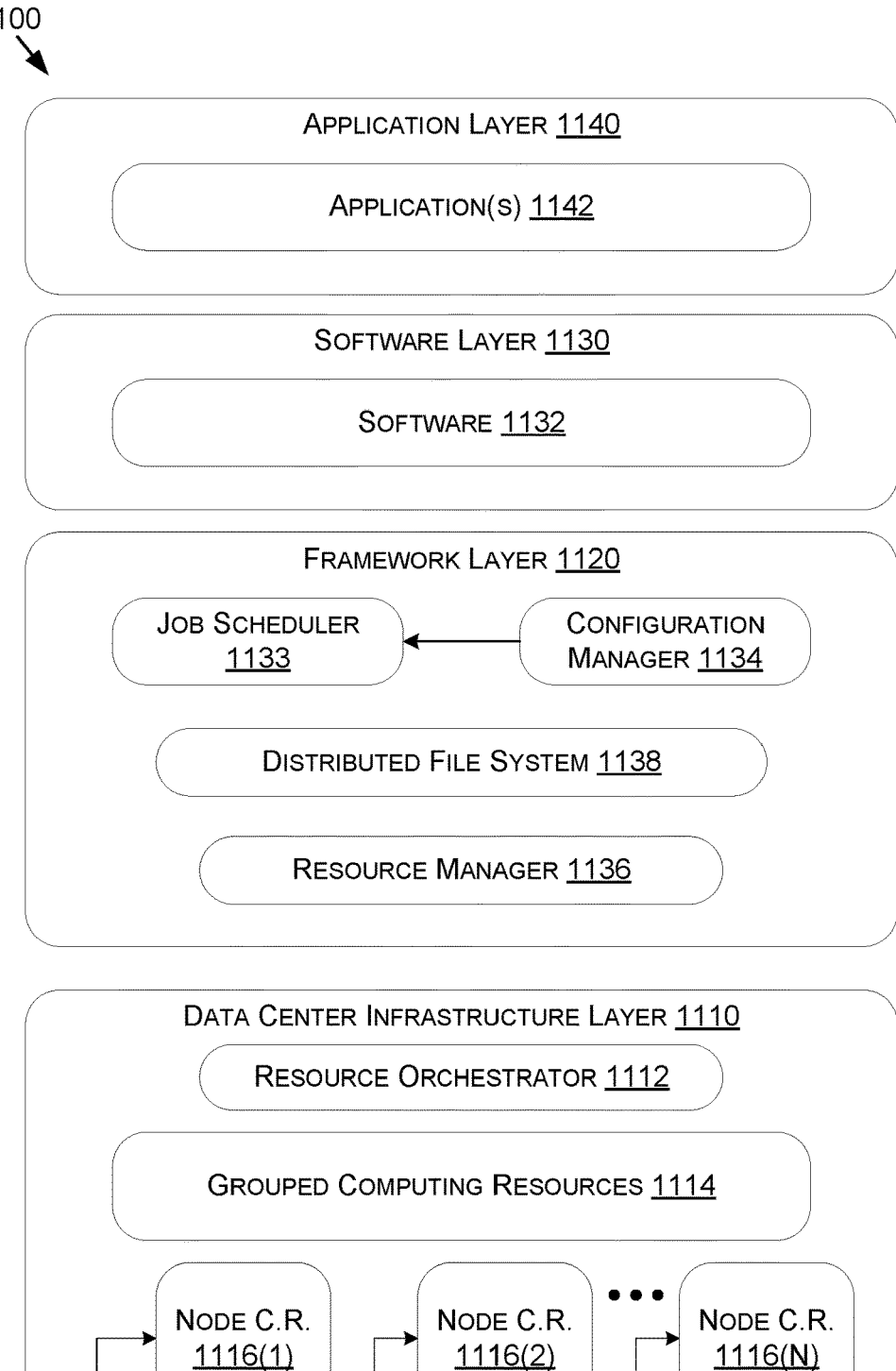
FIG. 11 is a block diagram of an example data center suitable for use in implementing some embodiments of the present disclosure.

FIG. 11 illustrates an example data center 1100 that may be used in at least one embodiments of the present disclosure. The data center 1100 may include a data center infrastructure layer 1110, a framework layer 1120, a software layer 1130, and/or an application layer 1140.

As shown in FIG. 11, the data center infrastructure layer 1110 may include a resource orchestrator 1112, grouped computing resources 1114, and node computing resources ("node C.R.s") 1116(1)-1116(N), where "N" represents any whole, positive integer. In at least one embodiment, node C.R.s 1116(1)-1116(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1116(1)-1116(N) may correspond to a server having one or more of the above-mentioned computing resources. In addition, in some embodiments, the node C.R.s 1116(1)-11161(N) may include one or more virtual components, such as vGPUs, vCPUs, and/or the like, and/or one or more of the node C.R.s 1116(1)-1116(N) may correspond to a virtual machine (VM).

In at least one embodiment, grouped computing resources 1114 may include separate groupings of node C.R.s 1116 housed within one or more racks (not shown), or many racks housed in data centers at various geographical locations (also not shown). Separate groupings of node C.R.s 1116 within grouped computing resources 1114 may include grouped compute, network, memory or storage resources that may be configured or allocated to support one or more workloads. In at least one embodiment, several node C.R.s 1116 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1112 may configure or otherwise control one or more node C.R.s 1116(1)-1116(N) and/or grouped computing resources 1114. In at least one embodiment, resource orchestrator 1112 may include a software design infrastructure (SDI) management entity for the data center 1100. The resource orchestrator 1112 may include hardware, software, or some combination thereof.

In at least one embodiment, as shown in FIG. 11, framework layer 1120 may include a job scheduler 1133, a configuration manager 1134, a resource manager 1136, and/or a distributed file system 1138. The framework layer 1120 may include a framework to support software 1132 of software layer 1130 and/or one or more application(s) 1142 of application layer 1140. The software 1132 or application(s) 1142 may respectively include web-based service software or applications, such as those provided by Amazon Web Services, Google Cloud and Microsoft Azure. The framework layer 1120 may be, but is not limited to, a type of free and open-source software web application framework such as Apache Spark™ (hereinafter "Spark") that may utilize distributed file system 1138 for large-scale data processing (e.g., "big data"). In at least one embodiment, job scheduler 1133 may include a Spark driver to facilitate scheduling of workloads supported by various layers of data center 1100. The configuration manager 1134 may be capable of configuring different layers such as software layer 1130 and framework layer 1120 including Spark and distributed file system 1138 for supporting large-scale data processing. The resource manager 1136 may be capable of managing clustered or grouped computing resources mapped to or allocated for support of distributed file system 1138 and job scheduler 1133. In at least one embodiment, clustered or grouped computing resources may include grouped computing resource 1114 at data center infrastructure layer 1110. The resource manager 1136 may coordinate with resource orchestrator 1112 to manage these mapped or allocated computing resources.

In at least one embodiment, software 1132 included in software layer 1130 may include software used by at least portions of node C.R.s 1116(1)-1116(N), grouped computing resources 1114, and/or distributed file system 1138 of framework layer 1120. One or more types of software may include, but are not limited to, Internet web page search software, e-mail virus scan software, database software, and streaming video content software.

In at least one embodiment, application(s) 1142 included in application layer 1140 may include one or more types of applications used by at least portions of node C.R.s 1116(1)-1116(N), grouped computing resources 1114, and/or distributed file system 1138 of framework layer 1120. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1134, resource manager 1136, and resource orchestrator 1112 may implement any number and type of self-modifying actions based on any amount and type of data acquired in any technically feasible fashion. Self-modifying actions may relieve a data center operator of data center 1100 from making possibly bad configuration decisions and possibly avoiding underutilized and/or poor performing portions of a data center.

The data center 1100 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1100. In at least one embodiment, trained or deployed machine learning models corresponding to one or more neural networks may be used to infer or predict information using resources described above with respect to the data center 1100 by using weight parameters calculated through one or more training techniques, such as but not limited to those described herein.

In at least one embodiment, the data center 1100 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1000 of FIG. 10—e.g., each device may include similar components, features, and/or functionality of the computing device(s) 1000. In addition, where backend devices (e.g., servers, NAS, etc.) are implemented, the backend devices may be included as part of a data center 1100, an example of which is described in more detail herein with respect to FIG. 11.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1000 described herein with respect to FIG. 10. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

In sum, the disclosed techniques use a path and speed planning system for robot navigation. The system includes a global route planner, a regional path planner, and a speed decision maker. The global route planner generates a global route plan between start and destination locations that includes a sequence of waypoints. The regional path planner generates a regional path from a current location to a destination based on a next waypoint of the global route plan by using a route finding algorithm. The regional path avoids obstacles and is in a region that includes at least a portion of the global route plan. The size of the region can be based on the sensing range of the robot, for example. The regional path planner discretizes each region along the global route plan by dividing the region into discrete units in which locations can be specified. The discretization can use Frenet coordinates to identify the locations of the discrete units. Frenet coordinates specify locations as longitudinal and lateral displacements along a particular route, such as the global route plan, for example.

The regional path is generated by a path solver, which uses a path searching algorithm to search for a regional path based on a target waypoint, one or more candidate next movements, and movement costs determined for the candidate next movements. The target waypoint can be the next waypoint on the global route plan, or a different identified waypoint if a path to the next waypoint on the global route plan is not feasible. If the path solver fails to find a regional path, e.g., because the possible paths are occupied, then a failure handler can expand the search space and cause the path solver to search the expanded search space. Alternatively, the failure handler can cause the global route plan to be adjusted, and the regional path planner can search for a regional path to a new target waypoint on the new global route plan.

The speed decision maker generates a set of speed directives that specify how the speed of a robot is to be changed to conform to speed constraints associated with a regional path as the robot moves along the regional path. The speed control directives are generated based on the regional path, which can be from the path planner, a semantic map indicating the locations of objects along the regional path, and/or a distance map from a perception system. The speed constraints can be static constraints, such as reduced speed zones, or dynamic constraints that vary over time as a result of motion of obstacles such as automatic doors or pedestrians. The speed decision maker provides the speed directives to a trajectory planner, which generates an optimized trajectory for the robot by jointly optimizing the regional path and speed directives. The speed decision maker generates a speed constraint for each object of the respective type along the regional path. Each constraint can apply to a location along the regional path during a particular range of time. For example, for an automatic door, a stopping constraint is generated when a door along the regional path is closed, and a speed zone constraint is generated to slow the robot when the door is open. The speed solver finds a sequence of speed control decisions that satisfy the constraints. The constraints impose costs when not satisfied, and the speed solver generates speed directives that minimize the overall constraint costs. There can be multiple interdependent constraints along a path, e.g., for multiple movable obstacles. If there are many interdependent constraints, the speed solver can search the combinations of paths and times permitted by the constraints to solve the constraints jointly.

One technical advantage of the disclosed techniques relative to the prior art is the ability to efficiently navigate large environments because fine-grain path planning is performed on individual regions instead of the substantially larger area between the start and destination locations. Further, Frenet coordinate discretization is used in the regions to improve the efficiency of path searching by focusing the path search on a space near the path. Accordingly, the disclosed techniques are faster and less resource-intensive than prior approaches that use a single path planner to generate the route. Another technical advantage of the disclosed techniques is the ability to dynamically adjust speed using semantic information from map labels and real-time perception, such as predicted positions of dynamic obstacles. Adjusting the speed in this way results in smoother robot motion, for example. Accordingly, the disclosed techniques enable the robot to navigate more safely and efficiently through the environment than prior approaches that do not use semantic information to dynamically adjust speed. These technical advantages represent one or more technological improvements over prior approaches.

1. In some embodiments, a method comprises identifying, using one or more maps of a physical environment, one or more obstacles associated with one or more portions of a path of a mobile robot in the physical environment; generating, based at least on the one or more obstacles, one or more speed constraints, each speed constraint specifying a speed limit for a respective portion of the path; and generating one or more speed change decisions specifying actions to be performed by the mobile robot to cause a speed profile of the mobile robot to satisfy the one or more speed constraints.

2. The method of clause 1, wherein a speed constraint of the one or more speed constraints is generated based at least on an obstacle type of a respective obstacle of the one or more obstacles.

3. The method of any of clauses 1-2, wherein the speed limit specified by the speed constraint is determined based at least on the obstacle type of the respective obstacle.

4. The method of any of clauses 1-3, wherein the obstacle type includes one or more of an automatic door, stairs, or a pedestrian.

5. The method of any of clauses 1-4, wherein the speed profile of the robot to satisfies the one or more speed constraints when the speed profile minimizes a sum of costs determined by the one or more speed constraints based on the speed profile.

6. The method of any of clauses 1-5, wherein the one or more obstacles include a dynamic obstacle identified by a distance map received from a perception system, wherein at least a portion of the dynamic obstacle moves over time in accordance with a motion description, and the speed limit is based on a location of at least a portion of the movable obstacle at a particular time.

7. The method of any of clauses 1-6, wherein each speed constraint generated based at least on the dynamic obstacle specifies a spatial range to which the speed constraint applies, and wherein the spatial range is determined based at least on motion of at least a portion of the dynamic obstacle over time as specified by the motion description.

8. The method of any of clauses 1-7, wherein each speed change decision of the one or more speed change decisions is generated using a respective speed constraint of the one or more speed constraints and specifies a speed-related action to be performed to cause a speed of the robot to satisfy the respective speed constraint.

9. The method of any of clauses 1-8, wherein the speed-related action comprises one or more of a stop action or an accelerate action.

10. The method of any of clauses 1-9, wherein the speed-related action applies to the mobile robot if the mobile robot is located within a distance range of a given obstacle on the path during a time range, wherein the given obstacle, the distance range, and the time range are specified by the respective speed constraint.

11. The method of any of clauses 1-10, further comprising generating, based at least on the one or more speed change decisions, one or more speed directives, each speed directive of the one or more speed directives specifying a distance range on the path, a time range, and a speed limit that applies to the mobile robot in the distance range during the time range.

12. The method of any of clauses 1-11, wherein the generating the one or more speed change decisions comprises generating one or more candidate speed profiles, each candidate speed profile satisfying one or more static speed constraints of the one or more speed constraints, and each static speed constraint being generated based at least on an obstacle that does not move during at least a determined time period; determining, based at least on the one or more candidate speed profiles, whether to generate a stop decision for a dynamic speed constraint of the one or more speed constraints, the dynamic speed constraint being generated based at least on a dynamic obstacle; and in response to determining that a stop decision is to be generated for the dynamic speed constraint, generating the stop decision based at east on the dynamic speed constraint, the one or more speed change decisions including the stop decision.

13. The method of any of clauses 1-12, wherein the generating the one or more speed change decisions comprises generating a representation of a path time-space region having a spatial dimension based at least on a length of the path and a time dimension based at least on a time of travel along the path, the path time-space region including a time-space representation of each speed constraint; searching the path time-space region for a particular speed profile that does not intersect the time-space representations of the speed constraints; and generating the one or more speed change decisions based at least on the particular speed profile.

14. The method of any of clauses 1-13, wherein the identifying the particular speed profile that satisfies the speed constraints comprises identifying one or more path time-space intervals of the representation of the path time-spare region; and searching each path time-space interval of the one or more path time-space intervals for a portion of the particular speed profile, the portion of the particular speed profile satisfying one or more particular speed constraints of the one or more speed constraints, and the one or more particular speed constraints having location ranges and time ranges that are in the interval.

15. The method of any of clauses 1-14, wherein each of the one or more obstacles is within a threshold distance of at least one point on the path of the mobile robot.

16. The method of any of clauses 1-15, wherein the speed profile represents values of the speed of the mobile robot during a time range.

17. In some embodiments, one or more processors comprise processing circuitry to perform operations comprising identifying, using one or more maps of a physical environment, one or more obstacles associated with one or more portions of a path of a mobile robot in the physical environment; generating, based at least on the one or more obstacles, one or more speed constraints, each speed constraint specifying a speed limit for a respective portion of the path; and generating one or more speed change decisions specifying actions to be performed by the mobile robot to cause a speed profile of the mobile robot to satisfy the one or more speed constraints.

18. The one or more processors of clause 17, wherein the one or more processors is comprised in at least one of a control system for an autonomous or semi-autonomous machine. a perception system for an autonomous or semi-autonomous machine. a system for performing simulation operations. a system for performing digital twin operations. a system for performing light transport simulation. a system for performing collaborative content creation for 3D assets. a system for performing deep learning operations. a system implemented using an edge device. a system for generating or presenting at least one of virtual reality content, augmented reality content, or mixed reality content. a system implemented using a robot. a system for performing conversational AI operations. a system for performing one or more generative AI operations. a system implementing one or more large language models (LLMs). a system for generating synthetic data. a system incorporating one or more virtual machines (VMs). a system implemented at least partially in a data center. or a system implemented at least partially using cloud computing resources.

19. In some embodiments, a system comprises one or more processors to perform operations comprising identifying, using one or more maps of a physical environment, one or more obstacles associated with one or more portions of a path of a mobile robot in the physical environment; generating, based at least on the one or more obstacles, one or more speed constraints, each speed constraint specifying a speed limit for a respective portion of the path; and generating one or more speed change decisions specifying actions to be performed by the mobile robot to cause a speed profile of the mobile robot to satisfy the one or more speed constraints.

20. The system of clause 19, wherein the system is comprised in at least one of a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system implemented using an edge device; a system for generating or presenting at least one of virtual reality content, augmented reality content, or mixed reality content; a system implemented using a robot; a system for performing conversational AI operations; a system for performing one or more generative AI operations; a system implementing one or more large language models (LLMs); a system for generating synthetic data; a system incorporating one or more virtual machines (VMs); a system implemented at least partially in a data center; or a system implemented at least partially using cloud computing resources.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method, comprising:

identifying, using one or more maps of a physical environment, one or more obstacles associated with one or more portions of a path of a mobile robot in the physical environment;

generating, based at least on the one or more obstacles, one or more speed constraints, each speed constraint specifying a speed limit for a respective portion of the path; and generating one or more speed change decisions specifying actions to be performed by the mobile robot to cause a speed profile of the mobile robot to satisfy the one or more speed constraints, wherein generating the one or more speed change decisions comprises:

generating a representation of a path time-space region having a spatial dimension based at least on a length of the path and a time dimension based at least on a time of travel along the path, the path time-space region including a time-space representation of each speed constraint;

searching the path time-space region for a particular speed profile that does not intersect the time-space representations of the speed constraints; and generating the one or more speed change decisions based at least on the particular speed profile.

2. The method of claim 1, wherein a speed constraint of the one or more speed constraints is generated based at least on an obstacle type of a respective obstacle of the one or more obstacles.

3. The method of claim 2, wherein the speed limit specified by the speed constraint is determined based at least on the obstacle type of the respective obstacle.

4. The method of claim 2, wherein the obstacle type includes one or more of an automatic door, stairs, or a pedestrian.

5. The method of claim 1, wherein the speed profile of the robot to satisfies the one or more speed constraints when the speed profile minimizes a sum of costs determined by the one or more speed constraints based on the speed profile.

6. The method of claim 1, wherein the one or more obstacles include a dynamic obstacle identified by a distance map received from a perception system, wherein at least a portion of the dynamic obstacle moves over time in accordance with a motion description, and the speed limit is based on a location of at least a portion of the movable obstacle at a particular time.

7. The method of claim 6, wherein each speed constraint generated based at least on the dynamic obstacle specifies a spatial range to which the speed constraint applies, and wherein the spatial range is determined based at least on motion of at least a portion of the dynamic obstacle over time as specified by the motion description.

8. The method of claim 1, wherein each speed change decision of the one or more speed change decisions is generated using a respective speed constraint of the one or more speed constraints and specifies a speed-related action to be performed to cause a speed of the robot to satisfy the respective speed constraint.

9. The method of claim 8, wherein the speed-related action comprises one or more of a stop action or an accelerate action.

10. The method of claim 9, wherein the speed-related action applies to the mobile robot if the mobile robot is located within a distance range of a given obstacle on the path during a time range, wherein the given obstacle, the distance range, and the time range are specified by the respective speed constraint.

11. The method of claim 1, further comprising:

generating, based at least on the one or more speed change decisions, one or more speed directives, each speed directive of the one or more speed directives specifying a distance range on the path, a time range, and a speed limit that applies to the mobile robot in the distance range during the time range.

12. The method of claim 1, wherein the generating the one or more speed change decisions comprises:

generating one or more candidate speed profiles, each candidate speed profile satisfying one or more static speed constraints of the one or more speed constraints, and each static speed constraint being generated based at least on an obstacle that does not move during at least a determined time period;

determining, based at least on the one or more candidate speed profiles, whether to generate a stop decision for a dynamic speed constraint of the one or more speed constraints, the dynamic speed constraint being generated based at least on a dynamic obstacle; and in response to determining that a stop decision is to be generated for the dynamic speed constraint, generating the stop decision based at east on the dynamic speed constraint, the one or more speed change decisions including the stop decision.

13. The method of claim 1, wherein the identifying the particular speed profile that satisfies the speed constraints comprises:

identifying one or more path time-space intervals of the representation of the path time-spare region; and searching each path time-space interval of the one or more path time-space intervals for a portion of the particular speed profile, the portion of the particular speed profile satisfying one or more particular speed constraints of the one or more speed constraints, and the one or more particular speed constraints having location ranges and time ranges that are in the interval.

14. The method of claim 1, wherein each of the one or more obstacles is within a threshold distance of at least one point on the path of the mobile robot.

15. The method of claim 1, wherein the speed profile represents values of the speed of the mobile robot during a time range.

16. One or more processors comprising:

processing circuitry to perform operations comprising:

identifying, using one or more maps of a physical environment, one or more obstacles associated with one or more portions of a path of a mobile robot in the physical environment;

generating, based at least on the one or more obstacles, one or more speed constraints, each speed constraint specifying a speed limit for a respective portion of the path; and generating one or more speed change decisions specifying actions to be performed by the mobile robot to cause a speed profile of the mobile robot to satisfy the one or more speed constraints, wherein generating the one or more speed change decisions comprises:

generating a representation of a path time-space region having a spatial dimension based at least on a length of the path and a time dimension based at least on a time of travel along the path, the path time-space region including a time-space representation of each speed constraint;

searching the path time-space region for a particular speed profile that does not intersect the time-space representations of the speed constraints; and generating the one or more speed change decisions based at least on the particular speed profile.

17. The one or more processors of claim 16, wherein the one or more processors is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system for generating or presenting at least one of virtual reality content, augmented reality content, or mixed reality content;

a system implemented using a robot;

a system for performing conversational AI operations;

a system for performing one or more generative AI operations;

a system implementing one or more large language models (LLMs);

a system for generating synthetic data;

a system incorporating one or more virtual machines (VMs);

a system implemented at least partially in a data center; or a system implemented at least partially using cloud computing resources.

18. A system comprising:

one or more processors to perform operations comprising:

identifying, using one or more maps of a physical environment, one or more obstacles associated with one or more portions of a path of a mobile robot in the physical environment;

generating, based at least on the one or more obstacles, one or more speed constraints, each speed constraint specifying a speed limit for a respective portion of the path; and generating one or more speed change decisions specifying actions to be performed by the mobile robot to cause a speed profile of the mobile robot to satisfy the one or more speed constraints, wherein generating the one or more speed change decisions comprises:

generating a representation of a path time-space region having a spatial dimension based at least on a length of the path and a time dimension based at least on a time of travel along the path, the path time-space region including a time-space representation of each speed constraint;

searching the path time-space region for a particular speed profile that does not intersect the time-space representations of the speed constraints; and generating the one or more speed change decisions based at least on the particular speed profile.

19. The system of claim 18, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system for generating or presenting at least one of virtual reality content, augmented reality content, or mixed reality content;

a system implemented using a robot;

a system for performing conversational AI operations;

a system for performing one or more generative AI operations;

a system implementing one or more large language models (LLMs);

a system for generating synthetic data;

a system incorporating one or more virtual machines (VMs);

a system implemented at least partially in a data center; or a system implemented at least partially using cloud computing resources.

*   *   *   *   *